(12) United States Patent
Chan et al.

(10) Patent No.: US 11,782,928 B2
(45) Date of Patent: Oct. 10, 2023

(54) COMPUTERIZED INFORMATION EXTRACTION FROM TABLES

(71) Applicant: MICROSOFT TECHNOLOGY LICENSING, LLC, Redmond, WA (US)

(72) Inventors: Pak On Chan, Redmond, WA (US); Sharada Shirish Acharya, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 343 days.

(21) Appl. No.: 16/917,515

(22) Filed: Jun. 30, 2020

(65) Prior Publication Data

US 2021/0406266 A1 Dec. 30, 2021

(51) Int. Cl.
*G06F 16/245* (2019.01)
*G06F 16/2455* (2019.01)
*G06N 3/08* (2023.01)
*G06N 3/044* (2023.01)
*G06N 3/045* (2023.01)

(52) U.S. Cl.
CPC ....... *G06F 16/24553* (2019.01); *G06N 3/044* (2023.01); *G06N 3/045* (2023.01); *G06N 3/08* (2013.01)

(58) Field of Classification Search
CPC ............ G06F 16/24553; G06N 3/0445; G06N 3/0454; G06N 3/08
See application file for complete search history.

(56) References Cited

U.S. PATENT DOCUMENTS

| 2005/0273695 | A1* | 12/2005 | Schnurr ................. G06F 40/18 715/213 |
| 2016/0034915 | A1* | 2/2016 | Soni ................... G06Q 30/0201 705/7.29 |
| 2018/0232528 | A1* | 8/2018 | Williamson ........... G06N 5/025 |
| 2019/0156061 | A1 | 5/2019 | Chakraborty et al. |
| 2019/0332784 | A1 | 10/2019 | Allen et al. |
| 2019/0354718 | A1 | 11/2019 | Chandnani et al. |

(Continued)

OTHER PUBLICATIONS

Ghasemi-Gol et al, "Tabular Cell Classification using Pre-Trained Cell Embeddings", Jan. 30, 2020, IEEE International Conference on Data Mining (ICDM), 2019, pp. 230-239, doi: 10.1109/ICDM.2019. 00033. (Year: 2019).*

(Continued)

*Primary Examiner* — Hosain T Alam
*Assistant Examiner* — Robert F May
(74) *Attorney, Agent, or Firm* — SHOOK, HARDY & BACON, L.L.P.

(57) ABSTRACT

Computerized systems are provided for detecting one or more tables and performing information extraction and analysis on any given table. Information can be extracted from one or more cells or fields of a table and feature vectors representing individual cells, rows, and/or columns of the table can be derived and concatenated together. In this way, embodiments can use some or all of the "context" or values contained in various feature vectors representing some or all of a single table as signals or factors to consider when generating a decision statistic, such as a classification prediction, for a particular cell.

20 Claims, 14 Drawing Sheets

(56) References Cited

U.S. PATENT DOCUMENTS

2020/0097718 A1* 3/2020 Schäfer ............... G06V 30/416
2021/0406452 A1* 12/2021 Hasan .................. G06N 3/045

OTHER PUBLICATIONS

Melamud et al. "Learning Generic Context Embedding with Bidirectional LSTM", 2016, "Proceedings of The 20th {SIGNLL} Conference on Computational Natural Language Learning", pp. 51-61 (Year: 2016).*

Gonsior et al., "Active Learning for Spreadsheet Cell Classification", Mar. 30, 2020, Proceedings of the Workshops of the EDBT/ICDT 2020 Joint Conference. (Year: 2020).*

Zhang et al., "Sato: Contextual Semantic Type Detection in Tables", Jun. 3, 2020, arXiv:1911.06311v3 (Year: 2020).*

Hulsebos et al., "Sherlock: A Deep Learning Approach to Semantic Data Type Detection", Jul. 25, 2019, KDD '19: Proceedings of the 25th ACM SIGKDD International Conference on Knowledge Discovery & Data Mining, pp. 1500-1508 (Year: 2019).*

Dong et al., "TableSense: Spreadsheet Table Detection with Convolutional Neural Networks", Jul. 17, 2019, AAAI. (Year: 2019).*

"International Search Report and Written Opinion Issued in PCT Application No. PCT/US21/034675", dated Aug. 27, 2021, 10 Pages.

"Synthetic Patient Generation", Retrieved from: https://web.archive.org/web/20200327140312/https://synthetichealth.github.io/synthea/, Mar. 27, 2020, 9 Pages.

Dong, et al., "TableSense: Spreadsheet Table Detection with Convolutional Neural Networks", In Proceedings of the AAAI Conference on Artificial Intelligence, Jul. 17, 2019, 8 Pages.

Dias, et al., "Named Entity Recognition For Sensitive Data Discovery in Portuguese", Applied Sciences 2020, 15 Pages.

* cited by examiner

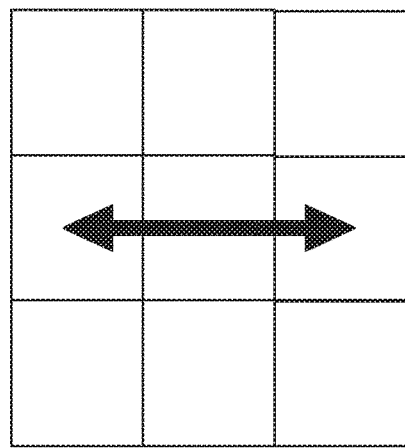
FIG. 7A.
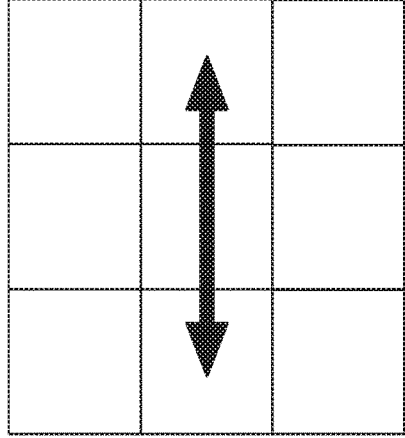
FIG. 7B.
FIG. 7C.
FIG. 7D.
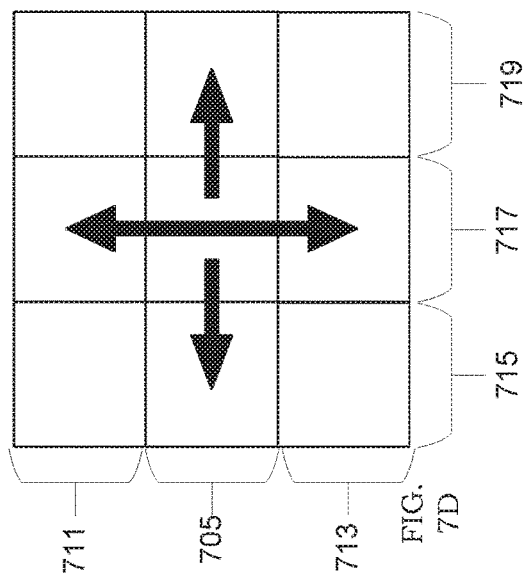
FIG. 7E.

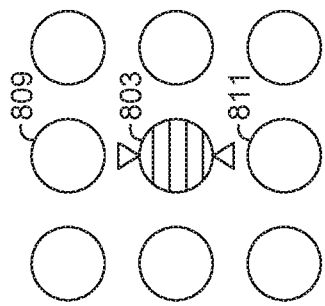
FIG. 8A.
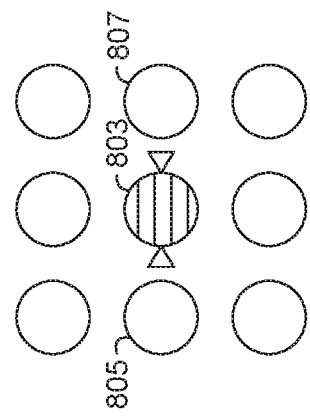
FIG. 8B.
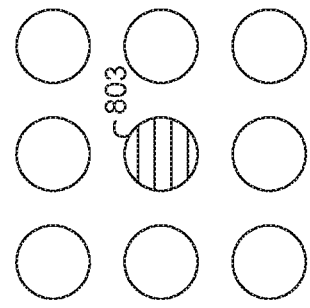
FIG. 8C.
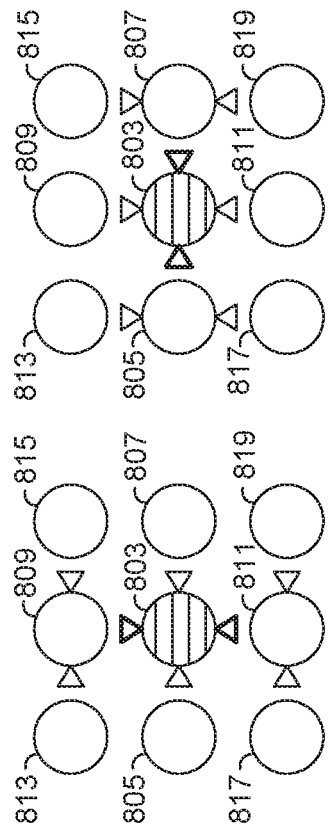
FIG. 8D.
FIG. 8E.

COMPUTERIZED INFORMATION EXTRACTION FROM TABLES

BACKGROUND

Computer-implemented technologies can process unstructured documents to assist users with various tasks. For example, some hand-coded text-to-speech technologies can process a natural language segment in a document based on static rules, grammatical patterns, or dictionaries. This can help users listen to an audio version of the document. However, these and other technologies require a great deal of grammatical knowledge and experience with natural language. These existing technologies and others also do not provide functionality for intelligently performing information extraction on structured data, such as a spreadsheet table, among other things. Further, existing technologies tend to exhibit prediction accuracy problems, such as high false positive rates. Moreover, existing technologies unnecessarily consume computing resources, such as memory, CPU, and network resources, among other things.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of this disclosure relate to computerized systems for detecting one or more tables and performing information extraction and analysis on any given table (e.g., a database table). For example, particular embodiments can perform specific object detection functionality to identify a table within a document and responsively extract features from one or more elements of the table.

Various aspects of the present disclosure extract information from one or more cells or fields of a table and responsively derive feature vectors representing individual cells, rows, and/or columns of the table and concatenate some or all of this information into another feature vector that aggregates these values. In this way, embodiments can use some or all of the "context" or values contained in various feature vectors representing some or all of a single table as signals or factors to consider when generating a decision statistic (e.g., a classification prediction) for a particular cell. For example, some embodiments predict that a table cell with the value "USA" refers to a "birthplace" rather than a "residence" based on the context of all row and column values of the rest of the table. Based on this decision statistic, some embodiments cause a computing device to obfuscate, encrypt, mask, or otherwise restrict access to an identity of content in a cell during display. For example, using the illustration above, based on "USA" being deemed to be a sensitive entity, some embodiments modify the original cell value of 893-85-8934 (within the same row as the "USA" value) to "social security number" such that "social security number" is displayed instead of the value "893-85-8934." Any social security number, for example, may be deemed to be sensitive information or information that is otherwise not to be displayed in a table when a person who the social security number belongs to was born in the United States since the United States identifies people by social security numbers.

By using some or all of the context of a given table for a given cell prediction, particular embodiments improve existing technologies by improving prediction accuracy (e.g., by predicting less false-positives), among other things.

BRIEF DESCRIPTION OF THE DRAWINGS

Aspects of the disclosure are described in detail below with reference to the attached drawing figures, wherein:

FIGS. 7A through 7E are schematic diagrams that represent the feature types from a table that are extracted and aggregated and how they are aggregated, according to some embodiments;

FIGS. 8A through 8E are schematic diagrams that represent how information is passed between each entry of a table when the table is analyzed and encoded, according to some embodiments;

DETAILED DESCRIPTION

Figure 1:
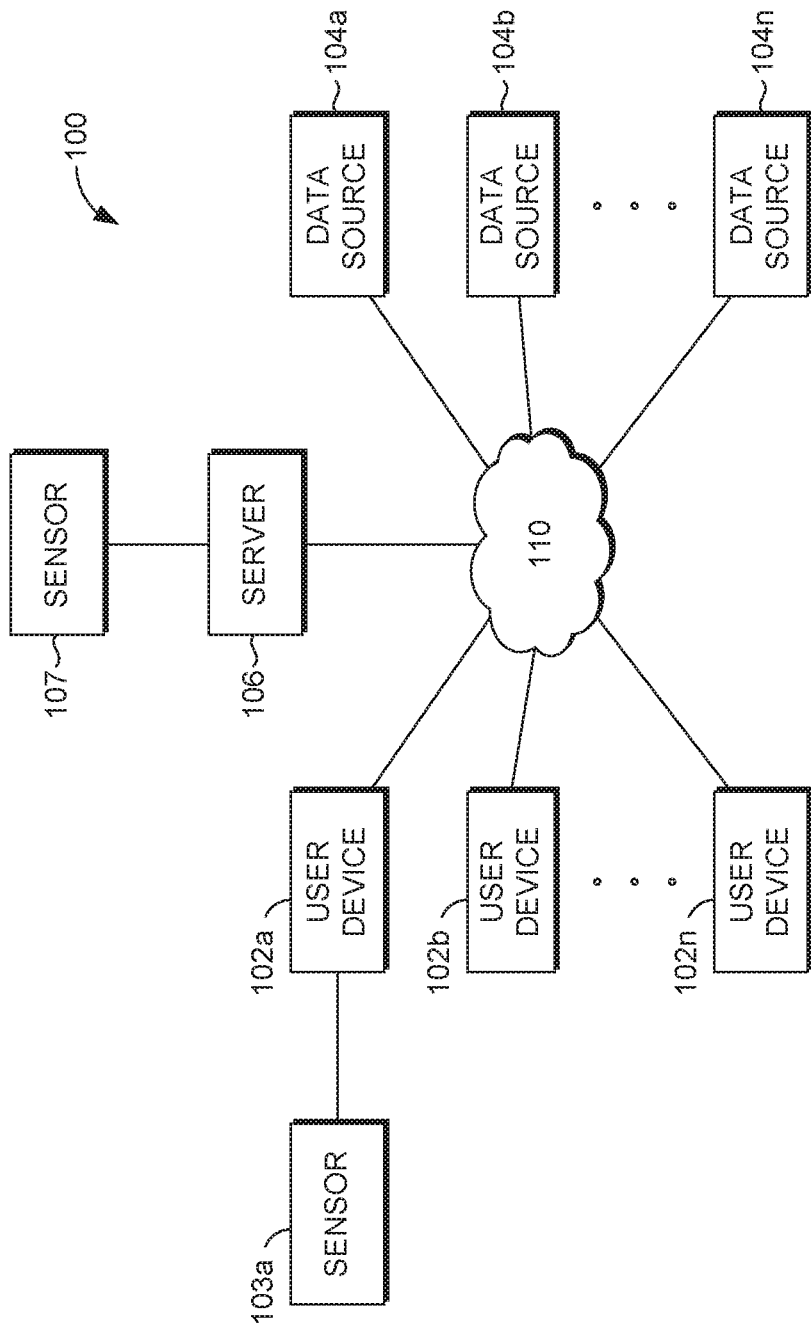
FIG. 1 is a block diagram of an exemplary computing environment suitable for use in implementing some embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a standalone application, a service or hosted service (standalone or in combination with another hosted service), or a plug-in to another product, to name a few.

As used herein, the term "set" may be employed to refer to an ordered (i.e., sequential) or an unordered (i.e., non-sequential) collection of objects (or elements), such as but not limited to data elements (e.g., events, cells, rows, and the like). A set may include N elements, where N is any non-negative integer that is 1 or greater. That is, a set may include 1, 2, 3 . . . N objects and/or elements, where N is a positive integer with no upper bound. A set may include only a single element. In other embodiments, a set may include a number of elements that is significantly greater than one, two, or three elements. For example, various embodiments and examples described herein refer to a "set" of features or a "set" of feature vectors. This refers to one or more features and one or more feature vectors respectively.

Information within structured data such as spreadsheet tables, database tables, and the like are used for various purposes. For instance, users may desire to view sales figures or other information contained in multiple fields of a MICROSOFT EXCEL table. However in some instances, one or more fields may be subject to sensitive personal data (e.g., a social security number). Accordingly, it may be desirable to encrypt, obfuscate, mask, delete, or otherwise hide the sensitive data. In other instances, users may desire to only view certain fields of information while disregarding others. For example, users may only be interested in content within the first 3 columns of a 10-column table. However, as described above, existing technologies lack the functionality for intelligently performing information extraction on structured data and so these technologies may fail to identify the type of data in a table, hide sensitive data, perform filtering to show only particular fields, or perform any other task that needs information extraction from tables. These technologies also exhibit prediction accuracy problems, as described in more detail below.

Various embodiments of the present disclosure make up these deficiencies and improve existing technologies by performing new functionality, as described herein. Certain aspects of the present disclosure are directed to detecting one or more tables and performing information extraction and analysis on any given table. A "table" as described herein refers to any suitable data structure that includes one or more columns and one or more rows. For example, the table can be a spreadsheet table (e.g., a MICROSOFT spreadsheet table), a database table (e.g., a relational database), a matrix structure, a 2-dimensional array, or any other suitable structure.

In an illustrative example of detecting one or more tables, particular embodiments can perform specific object detection functionality to detect a table. For example, particular embodiments use one or more machine learning models (e.g., a Convolutional Neural Network (CNN)) to generate a bounding box that defines the boundaries and encompasses a computer object representing the table. These machine learning models can also generate a classification prediction that the computer object is a table.

Various embodiments of the present disclosure perform information extraction and processing from tables in various ways. For instance, in some embodiments, a set of features are extracted from a first cell (e.g., a field) of a table. These "features" may represent particular content payload values within a cell itself and/or metadata associated with the content. For example, particular embodiments can extract a part-of-speech (POS) tag (e.g., data indicating whether a word is a noun or adjective) for each word in the first cell and a type of character for each character sequence (e.g., for the word "hi," indicating that both "h" and "i" are "letters") or perform other natural language processing technique so that computers can process and understand the information contained in the first cell.

Particular embodiments derive (e.g., receive or generate) a feature vector that represents the set of features of the first cell based on the extracting of the set of features. A "feature vector" (also referred to as a "vector") as described herein includes one or more real numbers, such as a series of floating values or integers (e.g., [0, 1, 0, 0]) that represent one or more other real numbers, a natural language (e.g., English) word and/or other character sequence (e.g., a symbol (e.g., @, !, #), a phrase, and/or sentence, etc.). Such natural language words and/or character sequences correspond to the set of features and are encoded or converted into corresponding feature vectors so that computers can process the corresponding extracted features.

Some embodiments alternatively or additionally extract another set of features and derive additional feature vectors from some or all additional cells of some or all of the rows and/or columns in the table. In this way, embodiments can use some or all of the "context" or values contained in these additional feature vectors as signals or factors to consider when generating a decision statistic (e.g., a classification), as described in more detail below. Particular embodiments of the present disclosure model or process these data by sequentially encoding particular feature vectors based on using one or more machine learning models. For example, some embodiments convert each feature vector of a row in a table from left to right in an ordered fashion into another concatenated feature vector. In some embodiments, such sequential encoding includes using a 1-dimensional and/or 2-dimensional bi-directional Long Short Term Memory (LSTM) model to encode sequential data into a concatenated or aggregated feature vector of multiple values representing multiple cells in a table. LSTMs are a type of recurrent neural network (RNN) capable of learning order dependence in sequence prediction problems. Various embodiments benefit from these models because of the inherent sequence and order of values within columns and rows of tables.

Some embodiments perform iterative passes or processing when encoding these data or deriving these feature vectors. This improves accuracy and can reduce false positive predictions. For example, some embodiments not only derive feature vectors from a first cell of a table, but they aggregate or concatenate each feature vector from the same row and/or column of the first cell. Some embodiments additionally (or alternatively) aggregate or concatenate each feature vector from different rows and/or columns of the first cell, by first reading the table horizontally (e.g., by the row) and then vertically (e.g., by the column), and then iteratively reading the table in a reverse order—i.e., vertically then horizontally. Such iterative passing or processing may be desirable because the more context or data in the cell that is analyzed, the more accurate predictions will be. Further, there may be certain biases or prediction errors when some information is read first before other information, thereby leading to false-positives, for example. For instance, if a row is read first and two regions "USA" and "Europe" were read from the same row first, it may wrongly be predicted that "USA" is a "birthplace" even after it reads the columns at a subsequent time. However, after analyzing the columns first, it can be determined that "USA" refers to the place of residence, and not the birthplace based on the header of the same column that "USA" is in.

Some embodiments concatenate some or all of the encoded feature vectors representing the first cell, the row of the first cell, the column of the first cell, additional rows, and additional columns and generate a decision statistic for any given cell based on this concatenation. A "decision statistic" as described herein refers to a classification prediction, a clustering score, a regression prediction, and/or any other prediction for the given cell. For example, some embodiments classify a first cell with contents "John Doe" as a "name ID" based on some or all of the context or encoded feature vectors of the table. Some embodiments cause display, to a computing device, of an identifier that indicates the decision statistic. For example, using the illustration above, some embodiments may cause presentation of a table and instead of displaying "John Doe," the string "name ID" may be displayed because "John Doe" is deemed to be sensitive. Some embodiments do not display any name information because the user does not desire to view any name information or one or more rules state not to display any name information at all.

As described above, existing technologies do not provide adequate functionality for intelligently performing information extraction on structured data, and they tend to exhibit prediction accuracy problems. For example, technologies including REGEX require tedious hand-coding and keyword evidence based on static rules or simple word matching. A disadvantage of these techniques is that they require a great deal of experience and grammatical knowledge of both the language and domain (e.g., expertise in a specific field of information). They are also extremely difficult to adapt outside of their scope, and it is hard and expensive to maintain over time. Other existing technologies use dictionaries or word lexicons. However, these are dependent on previously built knowledge bases (e.g., a gazetteer) in order to extract information by comparing words in a text with the knowledge base to find matches. The functionality of these techniques and other machine learning techniques fail to extract or process any information at all in structured data after detecting a table. Further these existing techniques lead to relatively low prediction accuracy and false positive rates (e.g., classifying a number as a "social security number" when in fact it is not). This is due in part because simple word matching, static rules, word lexicons and the like typically occur on a word-by-word basis and do not take into account contextual data (e.g., columns/rows) associated with a particular word where the contextual data is in a structured format.

Various embodiments of the present disclosure improve these existing technologies because they have the capability of intelligently (and automatically) extracting and processing information in structured data, such as a table in response to table detection. In this way, manually driven and tedious hand-coding, keyword evidence, static rules, word lexicons and the like are not required in particular embodiments. Further, embodiments can improve prediction accuracy (e.g., improve false positives) because the prediction associated with a single cell is based on contextual information outside of the cell (e.g., one or more columns and/or rows in the same table).

Existing technologies are also deficient regarding computing resource consumption, such as CPU, GPU, and memory, among other things. For instance, throughput and I/O is a problem with existing technologies because the rules they use for processing dictionaries, word lexicons, or other knowledge bases, require repetitive unnecessary computation of databases. An optimizer engine of a database manager module calculates a query execution plan (e.g., calculates cardinality, selectivity, etc.) each time a query is issued, which requires a database manager to find the least expensive query execution plan to fully execute the query. This decreases throughput and increases network latency, and can waste valuable time. Most database relations contain hundreds if not thousands of records. Repetitively calculating query execution plans to check if each word matches other words in a knowledge base based on this quantity of rows decreases throughput and increases network latency and potentially increases I/O (e.g., the quantity of times or time spent reaching out to a storage device, such as a disk).

Various embodiments of the present disclosure improve the computer itself by improving computing resource consumption, such as CPU, GPU, memory, and/or I/O. For example, using one or more machine learning models described herein increases throughput because these models can perform computations in parallel (e.g., by encoding rows and columns at substantially the same time or encoding different features of the same cell at substantially the same time) and/or because certain embodiments do not require using only knowledge bases, and therefore do not require repetitively calculating query execution plans, as described above.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 1100 described in connection to FIG. 11, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 14 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors 103a, 107, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
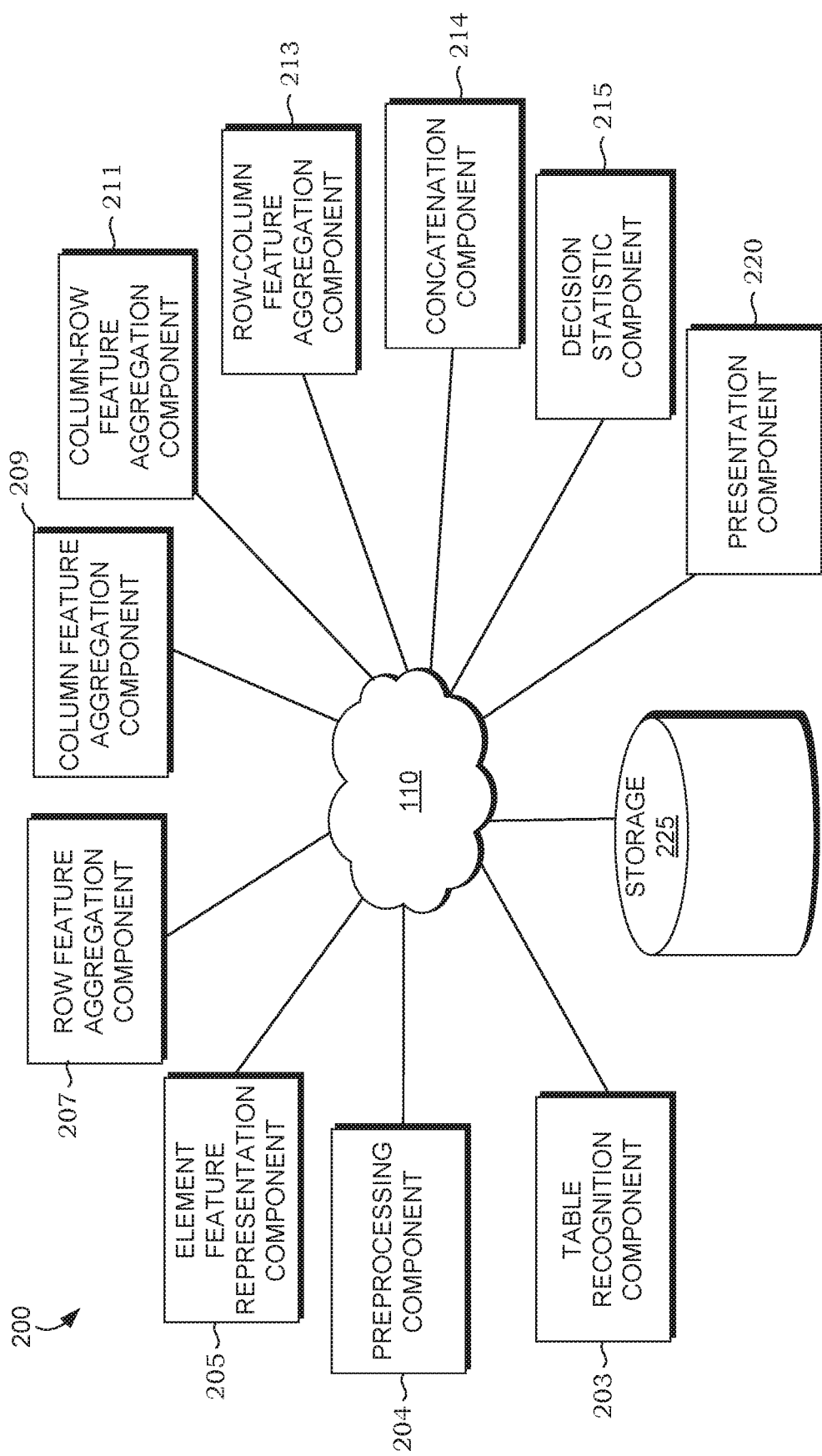
FIG. 2 is a block diagram illustrating an example system architecture for extracting information from a table, according to some embodiments.

Operating environment 100 can be utilized to implement one or more of the components of the system 200, described in FIG. 2, including components for extracting information from a table. Operating environment 100 also can be utilized for implementing aspects of process flow 1200, and/or 1300 as described with respect to FIGS. 12 and 13 respectively. Referring now to FIG. 2, with FIG. 1, a block diagram is provided showing aspects of an example computing system architecture suitable for implementing an embodiment of the disclosure and designated generally as system 200. The system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including the table recognition component 203, the element feature representation component 205, the row feature aggregation component 207, the column feature extraction component 209, the column-row feature aggregation component 211, the row-column feature extraction component 213, the decision statistic component 215, the presentation component 217, and storage 225. The system 200 is generally responsible for generating a decision statistic (e.g., a classification prediction) for an element (e.g., a cell) of a table and causing presentation of one or more unique identifiers that indicates the decision statistic.

Example system 200 includes the table recognition component 203. The table recognition component 203 is generally responsible for detecting or identifying a table (e.g., an EXCEL sheet table or relational database table) from a document (e.g., an EXCEL sheet or spreadsheet). In some embodiments, the table recognition component 203 uses object detection functionality to detect a table object. In computer vision applications, the output of table detection can be encompassed by a bounding box. A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects.

In some embodiments, one or more machine learning models can be used and trained to generate tighter bounding boxes for each object. In this way, bounding boxes can change in shape and confidence levels for classification/prediction can be increased based on increased training sessions. For example, the output of a Convolutional Neural Network (CNN) or any other machine learning model described herein can be one or more bounding boxes over each table where each bounding box includes the classification prediction (e.g., this object is a table) and the confidence level (e.g., 90% probability).

Some embodiments use machine learning models, such as CNNs to detect tables. For example, some embodiments use TABLESENSE algorithms, where an active training/learning approach is taken to label data in iterations, and where an effective uncertainty metric used to select the least confident data sets to label in a next iteration. Specifically, Precise Bounding Box Regression (PBR). The purpose of PBR is to minimize the absolute deviations between predicted boundary boxes and their ground truth values. It may be formulated as the cost function below:

$$L_{PBR}(t, t^*) = \sum_{i \in \{top, bottom, left, right\}} R(t_i - t_i^*)$$

-continued $$R(x) = \begin{cases} 0.5x^2, & \text{if } |x| < k, \\ 0.5k^2, & \text{otherwise,} \end{cases}$$

where R(x) indicates the loss function for absolute deviations, and parameter k controls the maximum tolerance on absolute deviation for PBR regression, and where t and t* are respectively the position and the reference position for the bounding box boundary. The loss increases monotonically with deviations less than k columns/rows and the same loss is incurred for any deviation over k. The loss R(x) is well suited for precise boundary regression, since any mismatch between detected boundaries and the ground truth is undesirable.

The preprocessing component 204 is generally responsible for formatting, tagging, and/or structuring the data in the detected table in some particular way. For example, some embodiments use one or more preprocessing rules to fill all empty cells in the detected cell with a string "NA." Some embodiments also treat each word or other character sequence (e.g., numbers, symbols, etc.) as a single token for processing. It is understood that although some embodiments treat the word sequence as a single token, particular embodiments read the sequence of words within a cell by using a deep learning model for sequences, (e.g. LSTM). One or more other preprocessing rules may be utilized to generate the decision statistic that the decision statistic component 215 makes. In these embodiments, some preprocessing rules may specify to classify or predict a specific element to be sensitive or displayed only if another element in the same row has a particular header cell value. For example, if the goal is to determine whether a piece of information is sensitive, and it was only determined that birthplaces within the United States is sensitive (and not birthplaces outside of the United States), then the preprocessing component 204 can replace the birthplace of places outside of the Unites states with the string NA, indicating that this data will not be analyzed.

In some embodiments, the preprocessing component 204 transforms data from the table into a clean (e.g., useable) data set. For example, the data may be collected, generated, and/or obtained in a raw format, which may not be feasible, effective, or usable for training a machine learning model. Additionally or alternatively, the data may include inaccurate or missing data (e.g., as a result of gaps in data collection, mistakes in data entries, technical problems with sensors, such as biometric sensors, and the like), noisy data (e.g., erroneous data or outliers), and/or inconsistent data (e.g., duplication of data, human data entry errors, mistakes in codes, etc.). During preprocessing, the data may undergo various processes, such as data cleaning, data integration, data transformation, data reduction, and/or the like. For example, when data includes inaccurate or missing data, the rows with missing data may be ignored (or deleted) and/or the missing data may be manually filled (in examples where the number of missing values is not too large to create an unreasonable task) (e.g., "NA"). For examples, to fill the missing values using computed values, the mean, mode, or median of the data could be used in place of the missing values.

When the data includes noisy data, the preprocessing component 24 may include data binning, clustering, employing a machine learning model, and/or manual removal. For example, substantially continuous data (e.g., data from table rows) from the data can be grouped together into a smaller number of "bins" (e.g., if raw training data includes every age from 0-100, the ages may be "binned" into groups of ages at five year intervals). As another example, similar data may be grouped together (e.g., into the same cluster or class), and/or a machine learning model (such as a regression algorithm) may be used to smooth the raw training data. In some examples, the noisy data can be deleted manually.

In some examples, after a portion of preprocessing, the data may undergo data wrangling (or data munging). For example, embodiments may use data wrangling during the training process of generating a trained model. Data wrangling may be used to transform and/or map the data into a different format that is more appropriate and/or valuable for downstream purposes (e.g., analytics). For example, as embodiments are training a model (e.g., after one or more iterations or epochs), a different format for the one or more types of the raw training data may be determined to be more suitable for downstream purposes than the format that is currently being used. By reformatting the raw training data, analysis of the input data, output data, and/or performance of a model may be more effective.

The element feature representation component 205 is generally responsible for extracting one or more features from one or more elements (e.g., cells or group of cells) of the table and representing the magnitude or value of those features in a particular format that is readable by computers. For example, in some embodiments, the element feature representation component 205 analyzes each word or other character sequence of a given cell and uses Natural Language Processing (NLP) to tag the character sequence with a particular Part-of-Speech (POS) tag (e.g., ["John", proper noun]) (e.g., a first feature) and tags each character of the character sequence with a character type (e.g., for the word "John" [letter, letter, letter, letter]) (e.g., a second feature). In other example, the element feature representation component extracts the color of the cell and/or the cell boundary (e.g., a rectangle) pattern (e.g., bold, dotted, etc.).

For some or each of these features, some embodiments generate or derive a feature vector that computers are configured to analyze. For example, using the illustration above, if the word "John" is the only information contained in a cell, "John" can be converted into a first feature vector via vector encoding (e.g., one hot encoding). For instance, the word "John" may be converted into the vector [1,0,0,0,0,0,0,0,0,0]. This vector representation, which may be 10 dimensions (although there may be more or less), may correspond to ordered words (e.g., each word in a sentence or vocabulary) and whether the word is TRUE or present. Because "John" is the only word being converted in this example, the integer 1 is used to indicate its representation. In this example, the cell does not contain any of the other words with it so the other values are represented as 0. In various embodiments, each character sequence (e.g., a word) in a cell is one-hot encoded by aggregating multiple words of a cell into single token (e.g. "United" and "States" is aggregated into a single token). This may be considered as one token and is represented as a one hot vector with one 1 element and all remaining elements 0s.)

In some embodiments, the element feature representation component 205 aggregates each feature value of a vector based on performing a contextual linear function or otherwise combining the output (e.g., a dot product or a softmax function) where the output is a feature vector or vector space embedding. The feature vector may thus be indicative of the actual coordinates that a feature vector will be embedded in feature space. For example, using the illustration above, the encoded "John" feature vector [1,0,0,0,0,0,0,0,0,0] can be converted or encoded to an output layer vector [1,2], which is the 2-dimensional plotting coordinates in feature space. However, it is understood that in some embodiments, the element feature representation component 205 concatenates multiple vectors into a single vector (also called an "entry" or "entry representation") so that values of each feature vector are aggregated or concatenated together in a single vector. In this way, deriving a feature vector can include concatenating a plurality of sub-vectors into a first vector, where each of the plurality of sub-vectors represent an individual feature of the element. For example, using the illustration above, "John" can represent a first vector (e.g., of 10 dimensions), "proper noun" can represent a second vector (e.g., of 10 dimensions), and "letter" can represent a third vector (e.g., of 10 dimensions). Particular embodiments can linearly combine (e.g., via a dot product function) each of these vectors and their dimensions (e.g., via a dot product) to derive an aggregated feature vector (e.g., of 30 dimensions by aggregating each of the 10 dimensions of the separate vectors).

In various embodiments, the output of the element feature representation component 205 is an object representing the table, where each entry (e.g., a concatenated feature vector) of the object represents a cell (or other element) and its extracted features of the table such that there is a collection of feature vectors. Thus, in some embodiments, each object representing the table is a collection of vectors $e_{ij} \in R^D$ arranged in a grid structure, where i=1, 2, ..., H, and j=1, 2, ..., W, where H and W are the height and width of each sample respectively. A "sample," as described herein refers to a document (e.g., a spreadsheet) that contains one or more tables (e.g., that are compactly packed together). For illustration purposes, each sample can be thought of as one table only in some embodiments. By reading the entries in the table (or object representing the table) collectively, the entries admit a much richer representation relative to existing technologies. The $0^{th}$ order entry feature vector (a first feature vector that is concatenated) representing a single element can be represented as $e_{ij} \in R^D$, where e represents a particular cell (or other element) at row i and column j. For example using the illustration above, the element feature representation component can encode the word meaning of "John" and POS "proper noun" of the entry of the cell. In this way some embodiments, the element feature representation component 205 may act as a base model or functionality by analyzing only the contents of individual cells, without analyzing other context (e.g., other cells within the same row or column of the same table).

The row feature aggregation component 207 is generally responsible for aggregating feature vectors for some (e.g., within a threshold) or each entry in a same row or record as a particular element. Accordingly, the row feature aggregation component 207 summarizes adjacent entries on the same row of the table. This is represented by $r_{ij}=f(e_{i1}, e_{i2}, \ldots, e_{iW})_j$ (where f is some aggregation function or contextual linear operation (e.g., a BiLSTM). In some embodiments, the row feature aggregation component 207 performs its functionality in response to the element feature representation component 205 performing its functionality, such that the row feature aggregation component 207 represents a first order contextual representation that is extracted horizontally (or across a row of a particular cell analyzed at 0 order).

In some embodiments, the row feature aggregation component 207 uses a machine learning model to encode each feature vector or entry of an object representing a particular row into a concatenated feature vector. In these embodiments, the input into the model is a first entry (e.g., a feature vector representing a first cell of a table) and the output is a sequence or aggregation of entries representing some or all of the elements of an entire row of a table. For example, a first cell of a first row may have the value "John" (e.g., corresponding to a name ID) included in a first vector and a second cell immediately adjacent to the first cell of the same row may have the value "Jake" (e.g., corresponding to John's physician) included in a second vector. Each of the values "John" and "Jake" can be aggregated into a single vector. This aggregation of entries (as well as any aggregation of other entries, such as columns) may be yet another feature vector referred to herein as "contextualized vectors." In this way, each row and the features of a row are modeled.

Figure 10:
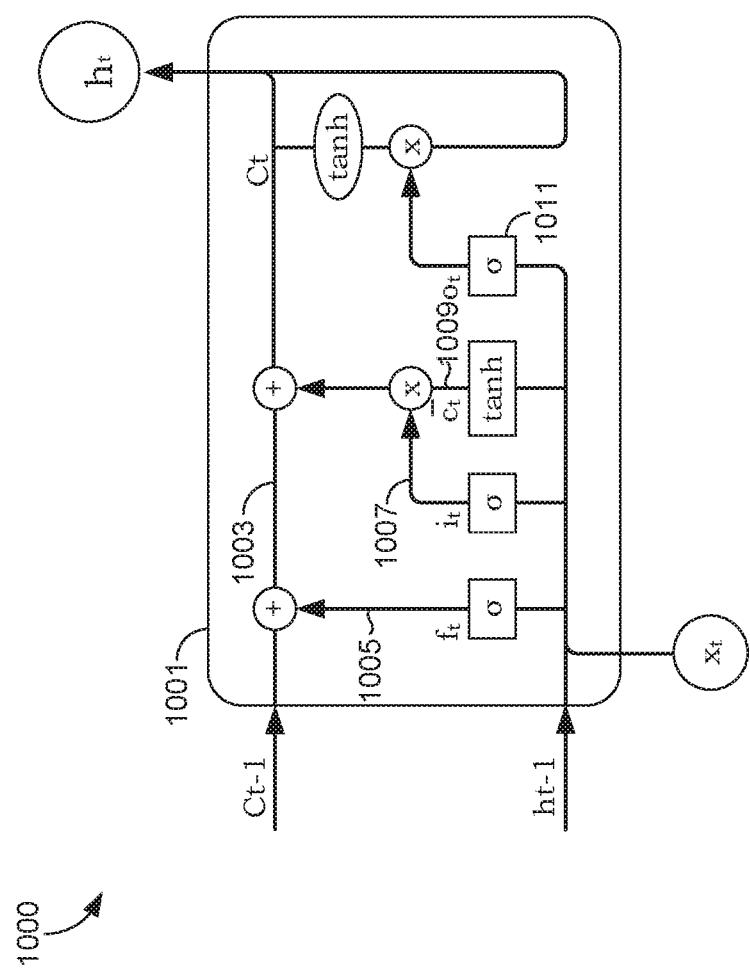
FIG. 10 is a schematic diagram illustrating how vectors are directionally or sequentially encoded using a Long Short Term Memory (LSTM) model, according to some embodiments.

In some embodiments the row feature aggregation component 207 uses a 1-dimensional bi-directional Long Short Term Memory (LSTM) model to sequentially read and encode each entry of an object (e.g., from left to right) to aggregate feature vectors into a contextualized vectors, which is described in more detail herein, such as FIG. 10.

The column feature aggregation component 209 is generally responsible for aggregating feature vectors for some (e.g., within a threshold) or each entry in a same column as a particular element. Accordingly, the column feature extraction component 209 summarizes or encodes all adjacent entries on the same column of the table. This is represented by $c_{ij}=f(e_{1j}, e_{2j}, \ldots, e_{Hj})_i$. In some embodiments, the column feature aggregation component 209 performs its functionality in response to the row feature aggregation component 207 performing its functionality, such that the column feature aggregation component 209 represents a first order contextual representation that is extracted vertically (or across a column of a particular cell analyzed at 0 order).

In some embodiments, the column feature extraction component 209 extracts meaning or context of a particular element based on the element's column header(s). For example, using the illustration above, for the entry that includes a vector representing "John," the header (e.g., a top-most oriented cell on a column indicating the class of attribute), the entry representing the header cell of a table may read "name." Accordingly, NLP modules may tokenize and process this to determine that "John" is the name or ID of a particular person.

In some embodiments, the column feature aggregation component 209 uses a machine learning model to aggregate or encode each feature vector or entry of an object representing a particular column. In these embodiments, the input into the model is a first entry (e.g., a feature vector representing a first cell of a table) and the output is a sequence or aggregation of entries representing some or all of the elements of an entire column of a table. For example, using the illustration above a first cell of a first columns may have the value "name" included in a first vector and a second cell immediately below the first cell of the same column may have the value "John" included in a second vector. Each of the values "name" and "John" can be aggregated into a single vector (e.g., a "contextualized vector"). In this way, each column and the features of a column are modeled.

In some embodiments the column feature aggregation component 209 uses a 1-dimensional bi-directional Long Short Term Memory (LSTM) model to sequentially read and encode each entry of an object (e.g., from top to bottom) to aggregate feature vectors in to contextualized vectors, which is described in more detail herein. The LSTM model may be 1-dimensional because it can only read data in one dimension or direction (e.g., vertically for column data).

The column-row feature aggregation component 211 is generally responsible for aggregating feature vectors for some (e.g., within a threshold) or all entries corresponding to an entire table by first reading the object representing the table horizontally (or by row) and then reading the object representing the table vertically (or by column). In reading the table horizontally, the column-row feature aggregation component 211 determines where the table starts and ends (e.g., by determining whether a cell has "N/A" as indicated by the preprocessing component 204 or determining whether each row is categorized into "margin" or "non-margin"). Accordingly, the column-row feature aggregation component 211 summarizes or encodes all entries representing an entire table in sequential row order and then column order. This is represented by $cr_{ij}=f(r_{1j}, r_{2j}, \ldots, r_{Hj})_i$. In some embodiments, the column-row feature aggregation component 211 performs its functionality in response to the column feature aggregation component 209 performing its functionality, such that the column-row feature component 211 represents a second order contextual representation.

In some embodiments, the column-row feature aggregation component 211 extracts meaning or context of a particular element based on other elements (e.g., rows and columns) outside of a current element being analyzed For example, using the illustration above, for the entry that includes a vector representing "John," there may be another entries within a different column and row, which reads "USA." Accordingly, by reading the entire table, embodiments can determine the entire context around John, such as determining that "USA" is part of an attribute corresponding to a column header of "birthplace" and therefore determining that John was born in the USA.

In some embodiments, the column-row feature aggregation component 211 uses a machine learning model to aggregate or summarize each feature vector or entry of an object representing an entire table. In these embodiments, the input into the model is a first entry (e.g., a feature vector representing a first cell of a table) and the output is multiple sequences or aggregations of entries representing some or all of a table. For example, the column-row feature aggregation component 211 may first scan or read each row of an object corresponding to each row of a table in a sequential manner from top to bottom (e.g., from the left-most cell to the right-most cell).). Alternatively, in some embodiments, each row is read or scanned in parallel (or at substantially the same time) instead of from top to bottom. This boosts the speed of the scan by H times. In some embodiments, the column-row feature aggregation component 211 may then scan or read each column of an object corresponding to each column of the table in a sequential manner from left to right (e.g., from a top-most cell to the bottom-most cell). Alternatively, in some embodiments, each column is read or scanned in parallel (or at substantially the same time) instead of from left to right. This boost the speed of the scan by W times.

In some embodiments the column-row feature aggregation component 211 uses a 2-dimensional bi-directional Long Short Term Memory (BiSLTM) model to sequentially read each entry of an object (e.g., horizontally and then vertically) to aggregate feature vectors in to contextualized vectors, which is described in more detail herein. A "2-dimensional" bi-directional LSTM processes 2-dimensional input (e.g., columns and rows). A one-dimensional BiLSTM, takes in 1-dimensional sequential data.

The row-column feature aggregation component 213 is generally responsible for aggregating feature vectors for some (e.g., within a threshold) or all entries corresponding to an entire table by first reading the object representing the table vertically (or by column) and then reading the object representing the table horizontally (or by row). In reading the table vertically, each element may already be encoded with the meaning from the header (e.g., via the column feature aggregation component 209). Accordingly, the row-column feature aggregation component 213 summarizes or encodes all entries representing an entire table in sequential column order and then row order. This is represented by $rc_{ij}=f(c_{i1}, c_{i2}, \ldots, c_{iW})_j$. In various instances, the reason why both the row-column feature aggregation component 213 and the column-row feature aggregation component may be used together to make a prediction (e.g., by the decision statistic component 215) is because there may be certain biases when some information is read first before other information, thereby leading to false-positives, for example. For instance, if a row is read first and two regions "USA" and "Europe" were read from the same row first, the decision statistic component 215 may wrongly predict that "USA" is a "birthplace" even after it reads the columns at a subsequent time. However, after analyzing the columns first, it can be determined that "USA" refers to the place of residence, and not the birthplace. In some embodiments, the row-column feature aggregation component 213 also helps the model to identify the horizontal start and end of a table. In the $1^{st}$ vertical scan, the model can identify a column with all "NA" as a margin. In the subsequent horizontal scan, the model knows when the table start and end.

In some embodiments, the row-column feature aggregation component 213 performs its functionality in response to the column-row feature aggregation component 211 performing its functionality. In some embodiments, the row-column feature aggregation component 213 extracts meaning or context of a particular element based on other elements (e.g., rows and columns) outside of a current element being analyzed. For example, using the illustration above, for the entry that includes a vector representing "John," there may be another entries within a different column and row, which reads "USA." Accordingly, by reading the entire table, embodiments can determine the entire context around John, such as determining that "USA" is part of an attribute corresponding to a column header of "birthplace" and therefore determining that John was born in the USA.

In some embodiments, the row-column feature aggregation component 213 uses a machine learning model to aggregate or summarize each feature vector or entry of an object representing an entire table. In these embodiments, the input into the model is a first entry (e.g., a feature vector representing a first cell of a table) and the output is multiple sequences or aggregations of entries representing some or all of a table. For example, the row-column feature aggregation component 213 may first scan or read each column of an object corresponding to each column of a table in a sequential manner from left to right. Alternatively, the row-column feature aggregation component 213 scans each column in parallel instead of left-to-right, as described above. The row-column feature aggregation component 213 may then scan or read each row of an object corresponding to each row of the table in a sequential manner from top to bottom. Alternatively, in some embodiments the row-column aggregation component 213 scans or reads each row of the table in parallel instead of top to bottom, as described above.

In some embodiments the row-column feature aggregation component 213 uses a 2-dimensional bi-directional Long Short Term Memory (LSTM) model to sequentially read each entry of an object (e.g., vertically and then horizontally) to aggregate feature vectors in to contextualized vectors, which is described in more detail herein.

The concatenation component 214 is generally responsible for concatenating some or all feature values of all cells or entries of a particular table such that an entire (or portion of) object or table and its features are aggregated together in a single object. For example, feature vectors or contextualized vectors derived from the element feature representation component 205, the row feature aggregation component 207, the column feature aggregation component 209, the column-row feature aggregation component 211, and/or the row-column feature aggregation component 213 can all be concatenated, as represented by $r_{ij} \oplus c_{ij} \oplus rc_{ij} \oplus cr_{ij}$+Logistic, where $\oplus$ represents concatenation. This equation illustrates that an entire row and column for a f or cell, as well as its contextual values in other rows and columns are concatenated to determine context.

The decision statistic component 215 is generally responsible for generating a decision statistic (e.g., classification prediction, regression prediction, or clustering prediction) based at least in part on functionality performed by the element feature representation component 205, the row feature aggregation component 207, the column feature aggregation component 209, the column-row feature aggregation component 211 the row-column feature aggregation component 213, and/or the concatenation component 214. That is for a given element, such as a cell, this component makes a prediction based on information contained in the same row as the element, the same column as the element, one or more different rows than the element, one or more different columns than the element, and/or a combination of these. In this way, a prediction can be made based on selected context of the table. For example, using the illustration above, using all of the table information for a table where the cell "John" is being analyzed, the decision statistic component 215 may classify "John" as being a "patient" (whose sensitive information is included in the table), as opposed to classifying John as the "boss" or some other person related to the patient. For instance, the same table may include the name "Jane" in the same record for "John." However, after embodiments analyze the entire table, it may be determined that the column header of "Jane" is "supervisor," which indicates that Jane is a supervisor of John rather than a patient.

In generating these decision statistics, in some embodiments, the decision statistic component 215 embeds the contextualized vectors described herein in feature space so that a distance can be determined between training (and/or testing) data in the feature space and an incoming contextualized vector (representing testing and/or data after model deployment). The distance between any two contextualized vectors (or any feature vector described herein) or class of vectors is measured according to any suitable method. For example, in some embodiments, automated cosine (or Euclidian) distance similarity is used to compute distance. Cosine similarity is a measure of similarity between two non-zero feature vectors of an inner product space that measures the cosine of the angle between the two non-zero feature vectors. In these embodiments, no similarity is expressed as a 90 degree angle, while total similarity (i.e., the same word) of 1 is a 0 degree angle. For example, a 0.98 distance between two contextual vectors reflects a very high similarity while a 0.003 distance reflects little similarity.

In some embodiments, the decision statistic component 215 makes a prediction for an element as part of training and/or testing data. Alternatively or additionally, the decision statistic component 215 makes a prediction for an element on a table after a machine learning model has been trained, tested, and deployed (e.g., the element has never been analyzed before and is not training and/or testing data). Training is the process of machine learning model learning or tuning such that a prediction statistic may become more increasingly accurate with higher confidence (and ideally with a lower error rate) after a particular threshold quantity of training sessions or epochs. For example, using the illustration above, if multiple tables nearly identical to the table where "John" is in a cell were analyzed at training, another similar table may be analyzed and based on the information being nearly identical to the trained tables, the decision statistic component 215 can predict that "Tom" is a "patient" based at least in part on prior tables having the patient identifier in the exact same position (e.g., the exact column) as a current table.

In some embodiments, training may include learning features (or feature values) of the feature vectors responsively weighting them during training. A "weight" in various instances represents the importance or significant of a feature or feature value for classification or prediction. For example, each feature may be associated with an integer or other real number where the higher the real number, the more significant the feature is for its classification. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores, which are described in more detail below. In many instances, only a selected set of features are primarily responsible for a determination of whether a particular predetermined image style belongs to a certain label.

Over various training stages or epochs, certain feature characteristics for each feature vector can be learned or weighted. For example, for a plurality of tables, the first column on the left always corresponds to a "patient ID," whereas other column features change considerably from table to table. Consequently, this pattern where the first column is always a patient ID can be weighted (e.g., a node connection is strengthened to a value close to 1), which is indicative of the feature vector taking on a classification of "patient." Accordingly, when an incoming element is analyzed, there may be relatively high weight for the first column such that the first column is likely a "patient" column. In this way, embodiments learn weights corresponding to different features such that similar features found in different tables contribute positively to a prediction statistic (e.g., a node is activated) and features that can change contribute negatively to the prediction statistic (e.g., a node is inhibited).

In some embodiments, the decision statistic is generated based at least in part on the preprocessing rules described with respect to the preprocessing component 204. For example, rather than check only a header cell (e.g., "SSN"), embodiments evaluate each cell relative to other table features (e.g., cells in the same/different column and/or in the same/different row) to determine if a particular cell satisfies a more complex rule (e.g., a cell in the SSN column is only sensitive if another cell of the same row indicates a USA in a column that has a header indicating the country.

The presentation component 220 is generally responsible for presenting content and related information to a user, such as identifiers indicated by the decision statistic component 215. Presentation component 220 may comprise one or more applications or services on a user device, across multiple user devices, or in the cloud. For example, in one embodiment, presentation component 220 manages the presentation of content to a user across multiple user devices associated with that user. Based on content logic, device features, and/or other user data, presentation component 220 may determine on which user device(s) content is presented, as well as the context of the presentation, such as how (or in what format and how much content, which can be dependent on the user device or context) it is presented, when it is presented. In particular, in some embodiments, presentation component 220 applies content logic to device features, or sensed user data to determine aspects of content presentation.

In some embodiments, presentation component 220 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation component 220 can present a new table that is nearly identical to the table detected by the table recognition component 203, except that each cell of the table displays (or is configured to display) a classification identifier. For example, in response to a user-moved mouse pointer (or user gesture) hovering over or moving across the cell that has the name "John," the presentation component 220 can automatically cause a pop-up UI element (e.g., a window) to display the identifier "patient," which is indicative that "John" refers to a patient.

In some embodiments, the presentation component 120 renders an image or document with detected object instances or classifications, such as bounding boxes superimposed over table objects with a level of confidence and classification of each object instance, as determined by the table recognition component 203.

Example system 200 also includes storage 225. Storage 225 generally stores information including data, data structures, computer instructions (e.g., software program instructions, routines, or services), and/or models (e.g., machine learning models) used in some embodiments of the technologies described herein. In some embodiments, storage 225 comprises a data store (or computer data memory) of different tables (e.g., spreadsheet tables and database tables) used in training. Further, although depicted as a single data store component, storage 225 may be embodied as one or more data stores (e.g., a distributed storage network) or may be in the cloud.

Figure 3:
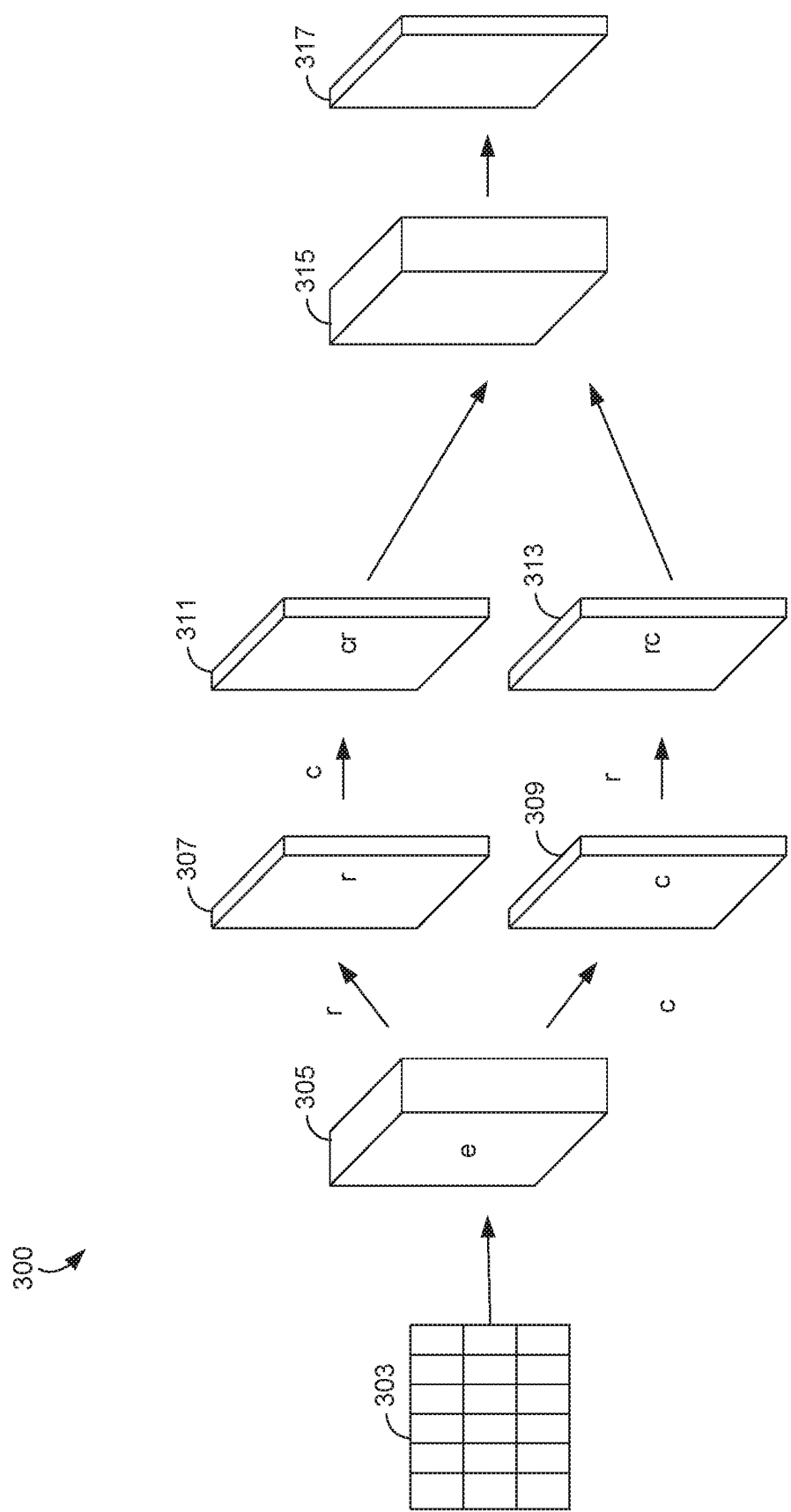
FIG. 3 is a schematic diagram of an example system illustrating one or more models, or layers of a single model, that can be utilized to generate an output image of a table, according to some embodiments.

FIG. 3 is a schematic diagram of an example system 300 illustrating one or more models (or layers of a single model) that can be utilized to generate an output image of a table, according to some embodiments. In some embodiments, some or each of the models/layers described with respect to FIG. 3 are included in or used by some or each of the components of the system 200, as described in more detail herein.

The input table 303 represents any suitable table or structured data object that includes natural language text and/or human-readable real-numbers (e.g., integers), and/or symbols (e.g., %, $, @, images, or emojies, etc.). For example the input table 303 can represent a table (or a document of tables) within a spreadsheet (e.g., a MICROSOFT EXCEL spreadsheet) that includes sales figures, or the like. Alternatively or additionally, the input table 303 can represent any suitable database table with columns/rows, such as a relational database.

The model/layer 305 represents an algorithm or functionality where the input is the input table 303 and the output is an object (e.g., another table or grid structure) that represents the input table 303 and each extracted feature of each element (e.g., cell) of the input table 303. For example, in some embodiments, the model/layer 305 (also referred to herein as the "E model") represents functionality performed or used by the element feature representation component 205, as described with respect to FIG. 2 such that the object can represent a table or object of feature vectors where each cell or entry is represented by a feature vector. Accordingly, in some embodiments, each object representing the table is a collection of feature vectors $e_{ij}$ where $e_{ij} \in R^D$ is arranged in a grid structure, and where i=1, 2, . . . , H, and j=1, 2, . . . , W (e.g., where there are 30 dimensions—H×W×30).

The row model/layer 307 represents an algorithm or functionality where the input is a first entry (e.g., a cell) of the object mode/layer 305 and the output is a first encoded contextualized vector that aggregates all (or a portion of) feature values of the same row as the first entry. For example, in some embodiments, the row model/layer 307 (also referred to herein as the "R model") represents functionality performed or used by the row feature aggregation component 207, as described with respect to FIG. 2. Accordingly, in some embodiments, this is represented by $r_{ij}$ where $r_{ij} = f(e_{i1}, e_{i2}, \ldots, e_{iW})_j$ (e.g., where there are 10 dimensions—H×W×10). It is understood, that the row model/layer 307 can sequentially encode each row within the input object 305. For example, each cell of a row for the first entry is processed in parallel with a cell of a second row for a second entry.

The column model/layer 309 represents an algorithm or functionality where the input is a first entry (e.g., the same first entry described with respect to the row model/layer 307) of the object mode/layer 305 and the output is a second encoded contextualized vector that aggregates all feature values of the same column as the first entry. For example, in some embodiments, the column model/layer 309 (also referred to herein as the "C model") represents functionality performed or used by the column feature aggregation component 209, as described with respect to FIG. 2. Accordingly, in some embodiments, this is represented by $c_{ij}$ where $c_{ij} = f(e_{1j}, e_{2j}, \ldots, e_{Hj})_i$ (e.g., where there are 10 dimensions—H×W×10). It is understood that the column model/layer 309 can sequentially encode each column within the input object 305. For example, each cell of a column for the first entry is processed in parallel with each cell of a second column for a second entry.

The column-row model/layer 311 represents an algorithm or functionality where the input is the first contextualized vector (e.g., the contextualized vector that aggregates all features of a row of the first entry that is the output of the row model/layer 307) and the output is a third encoded contextualized vector that aggregates all entries of the object (i.e., the output of the object model/layer 305). For example, in some embodiments, the column-row model/layer 311 represents functionality performed or used by the column-row feature aggregation component 211, as described with respect to FIG. 2. Accordingly, in some embodiments, the feature values of each row of an object are first aggregated, followed by the feature values of each column of the same object. This may be represented by $cr_{ij}$ where $cr_{ij}=f(r_{1j}, r_{2j}, \ldots, r_{Hj})_i$ (e.g., where there are 10 dimensions—H×W×10).

The row-column model/layer 313 represents an algorithm or functionality where the input is the second contextualized vector (e.g., the contextualized vector that aggregates all features of a column of the first entry that is the output of the column model/layer 309) and the output is a fourth contextualized vector that aggregates all entries of the object (i.e., the output of the object model/layer 305). For example, in some embodiments, the row-column model/layer 313 represents functionality performed or used by the row-column feature aggregation component 213, as described with respect to FIG. 2. Accordingly, in some embodiments, the feature values of each column of an object are first aggregated, followed by the feature values of each row of the same object. This may be represented by $rc_{ij}$ where $rc_{ij}=f(c_{i1}, c_{i2}, \ldots, c_{iW})_j$ (e.g., there are 10 dimensions—H×W×10).

The concatenation model/layer 315 represents an algorithm or functionality where the input is the third contextualized vector from the column-row model/layer 311 and the fourth contextualized vector from the row-column model/layer 313 and the output is a concatenation or aggregation of the third contextualized vector and the fourth contextualized vector. For example, in some embodiments, the concatenation model/layer 315 (also referred to herein as the "C+R+RC+CR model") represents functionality performed or used by concatenation component 214, as described with respect to FIG. 2. Accordingly, in some embodiments, all (or a portion of) feature values of all models/layers used are concatenated or aggregated. This may be represented by $r_{ij} \oplus c_{ij} \oplus rc_{ij} \oplus cr_{ij}$+Logistic. Thus, the concatenation model/layer 315 can concatenate some or all of the features.

In various embodiments, in response to the concatenation model/layer 315 performing its functionality, a prediction statistic (e.g., a classification) is generated for one or more elements, such as cells. For example, using the decision statistic component 215, the values within first cell or first entry (e.g., 412-56-8997) can be classified as a "social security number" based on the context (e.g., all of the features of every cell) of the entire input table 303 (values aggregated by the concatenation model/layer 315). In some embodiments, during classification or other prediction statistic generation embodiments estimate the probability of different outcomes (e.g., the probability that the first cell should be classified as something different, such as "account number"). In some embodiments, this estimate is trained by a cross entropy loss $L(y,\hat{y})=-\Sigma_{i,j} \Sigma_c y_{i,j,c} 1 \hat{y}_{i,j,c}$ where $y_{i,j,c}$ is the ground truth label (0 or 1) for class c at row i and column j, and $\hat{y}_{i,j,c}$ is the predicted probability to be in class c at row i and column j.

The output of the system 300 is an element-wise logistics layer or output table 317. This output table 317 may be identical to the input table 303, except that there are annotations or other identifiers that indicate the prediction statistic described above. For example, using the illustration above, in response to receiving a user gesture over a particular cell that contains the value "412-56-8997" a pop-up window may display an identifier that reads "social security number" indicative of the predicted classification.

Figure 4:
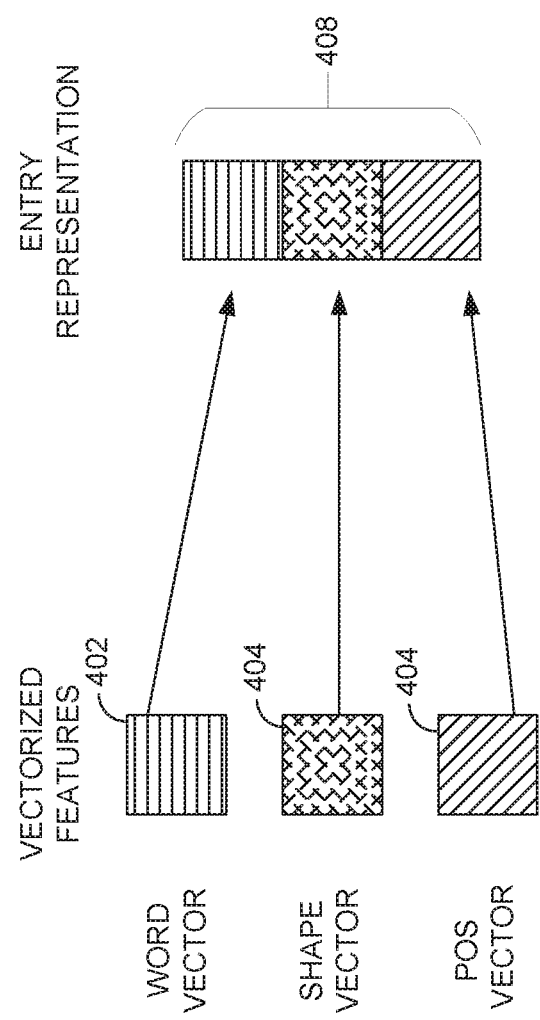
FIG. 4 is a block diagram illustrating how entries or feature vectors of individual elements are generated, according to some embodiments.

Turning now to FIG. 4, a block diagram illustrating how entries or feature vectors of individual elements (e.g., cells) are generated, according to some embodiments. In some embodiments, FIG. 4 illustrates how entries are generated, as described with respect to the element feature representation component 205 of FIG. 2.

According to various embodiments a plurality of feature vectors are generated for a single element of a table, such as a cell. Each of these feature vectors may each represent a particular different feature and/or feature class. For example, the feature vector 402 represents a word vector. A "word vector" is a feature vector that represents a payload or identity of one or more natural language words (or version of the word) in an element. In some embodiments, an NLP module or other functionality breaks down or re-structures each word into its base form using lemmatization or stemming. Lemmatization and stemming is the process of reducing different one or more inflected forms of a word into a base word so that they are analyzed as a single item. For example, the NLP module can parse the word "played" contained in a cell and modify it to be "play." In various embodiments the word vector has multiple dimensions and represents any quantity of words in a word vocabulary or set (e.g., 1500 top words in a search engine). Words themselves are often indicative of the class or type of information present. For example, the word "John" is indicative of a "name," which may be deemed to be sensitive information.

The feature the feature vector 404 represents a shape vector. A "shape vector" is a feature vector that indicates the type or class of one or more characters of a particular element. For instance, the shape vector can indicate whether a character is a letter, number (e.g., an integer or other real number), and/or a symbol or type of symbol (e.g., picture, exclamation point, question mark, etc.). Using the example above, for the word "play," the element feature representation component 205 may indicate that each character is a "letter" (e.g., [letter, letter, letter, letter]). In various embodiments the shape vector has multiple dimensions and represents any quantity of attributes in a vocabulary or set (e.g., 1500 top shapes). Shapes or the types of characters are often indicative of the class or type of information present. For example, if all characters are numbers, embodiments can automatically infer that this class of information is not a name, address, or any other class of information that requires natural language representations.

The feature vector 406 represents a POS vector. A "POS vector" is a feature vector that indicates the part of speech (e.g., noun, verb, adjective, pronoun, proper noun, etc.) of one or more words within a particular element. For instance an NLP model can tag each word of a cell with a POS identifier. Using the example above, for the word "play," the element feature representation component 205 may tag play as a "verb" (e.g., [play, verb]). In various embodiments the POS vector has multiple dimensions and represents any quantity of attributes in a vocabulary or set (e.g., 100 top parts of speech). POS is also indicative of the class or type of information within an element. For example, a proper noun may mostly correspond to a name or name field.

It is understood that the feature vectors 402, 404, and 406 are representative only. As such, there may be more or less vectors of differing types. For example, in some embodiments, there may be a "dimension vector," which takes into account the dimensions or actual size of a cell, for example. The size of a cell may be indicative of whether the corresponding information is a header or some value under the header. This is because in some cases, the header cells may be larger than the other cells to indicate the class or type of information associated with the header. In another example, there may be a "color vector," which takes into account the color of the cell (and/or information in the cell). In some cases, the color may indicate the type of content contained therein or the type of cell (e.g., a header cell).

FIG. 4 additionally illustrates that each of the feature vectors and their corresponding values are aggregated into the entry 408 (i.e., single feature vector). Accordingly, embodiments concatenate each vector (e.g., of 10 dimensions) to a single vector (e.g., of 30 dimensions), which consolidates all values together in a single container or object. In some embodiments, each of the information extracted from the feature vectors 402, 404, and 406 is performed by spaCy algorithms. SpaCy is an open-source software library for advance natural language processing.

Figure 5:
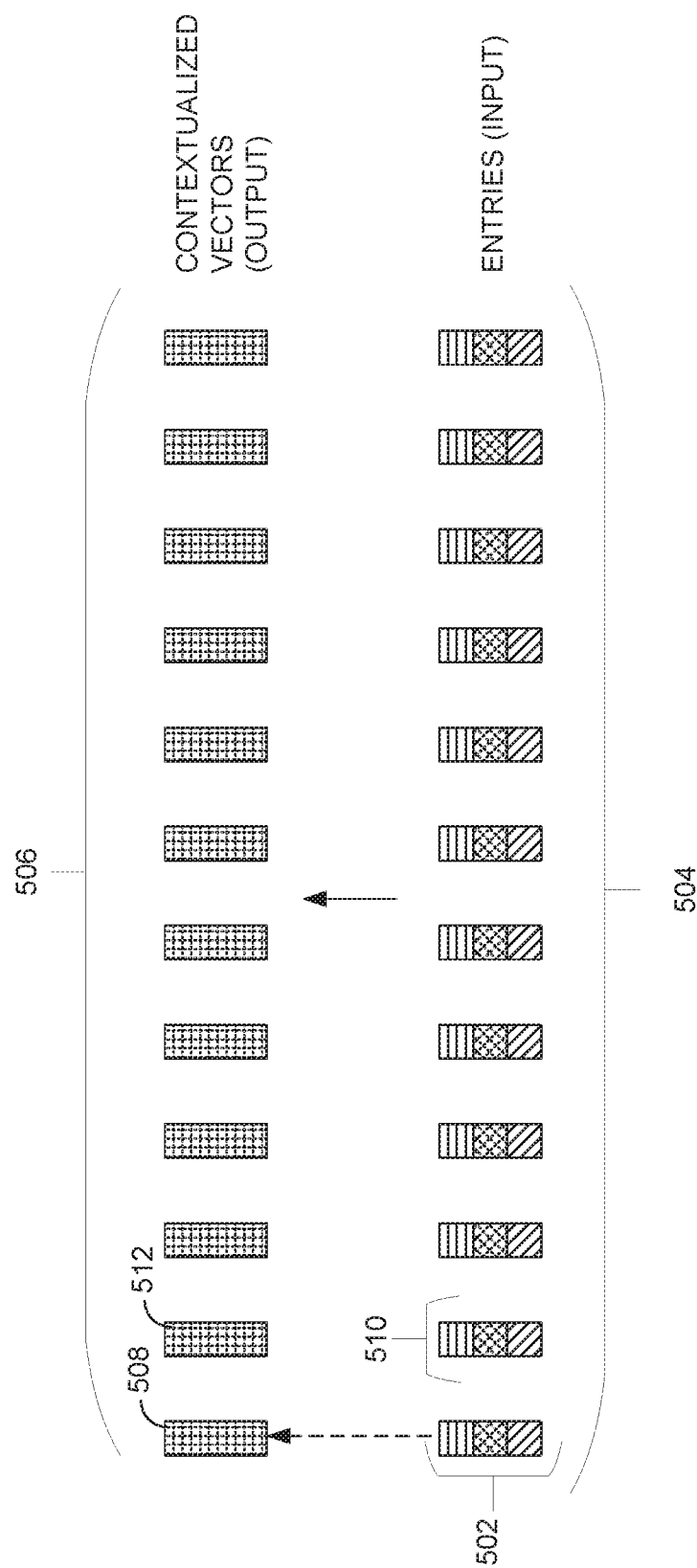
FIG. 5 is a schematic diagram that illustrates encoding a sequence of feature vectors into corresponding contextualized vectors, according to some embodiments.

FIG. 5 is a schematic diagram that illustrates encoding a sequence of feature vectors into corresponding contextualized vectors, according to some embodiments. In some embodiments, FIG. 5 represents the functionality as described with respect to the row model/layer 307 and/or the column model/layer of FIG. 3, the R model and/or the C model, and/or the row feature aggregation component 207 and/or the column feature aggregation component 207. In some embodiments, the feature vector (i.e., the entry 502) represents the entry 408 of FIG. 4.

The group of feature vectors 504 (e.g., a group of entries that are each the same or similar to the entry 408) represents a row or column of an object or table. Accordingly, the input is a sequence of feature vectors and the output is a sequence of contextualized vectors 508. In various embodiments, a machine learning model reads the group of feature vectors 504 sequentially and converts each entry into a corresponding contextualized vector. For example, at a first time, a 1-dimensional bi-directional LSTM model may first encode the entry 502 representing a header cell into the contextualized vector 508. At a second time subsequent to the first time, the 1-dimensional bi-directional LSTM model may encode the entry 510 representing a cell immediately adjacent and below the header cell in the same column into the contextualized vector 512. This process may continue in some embodiments until each cell of each row or column is converted.

Figure 6:
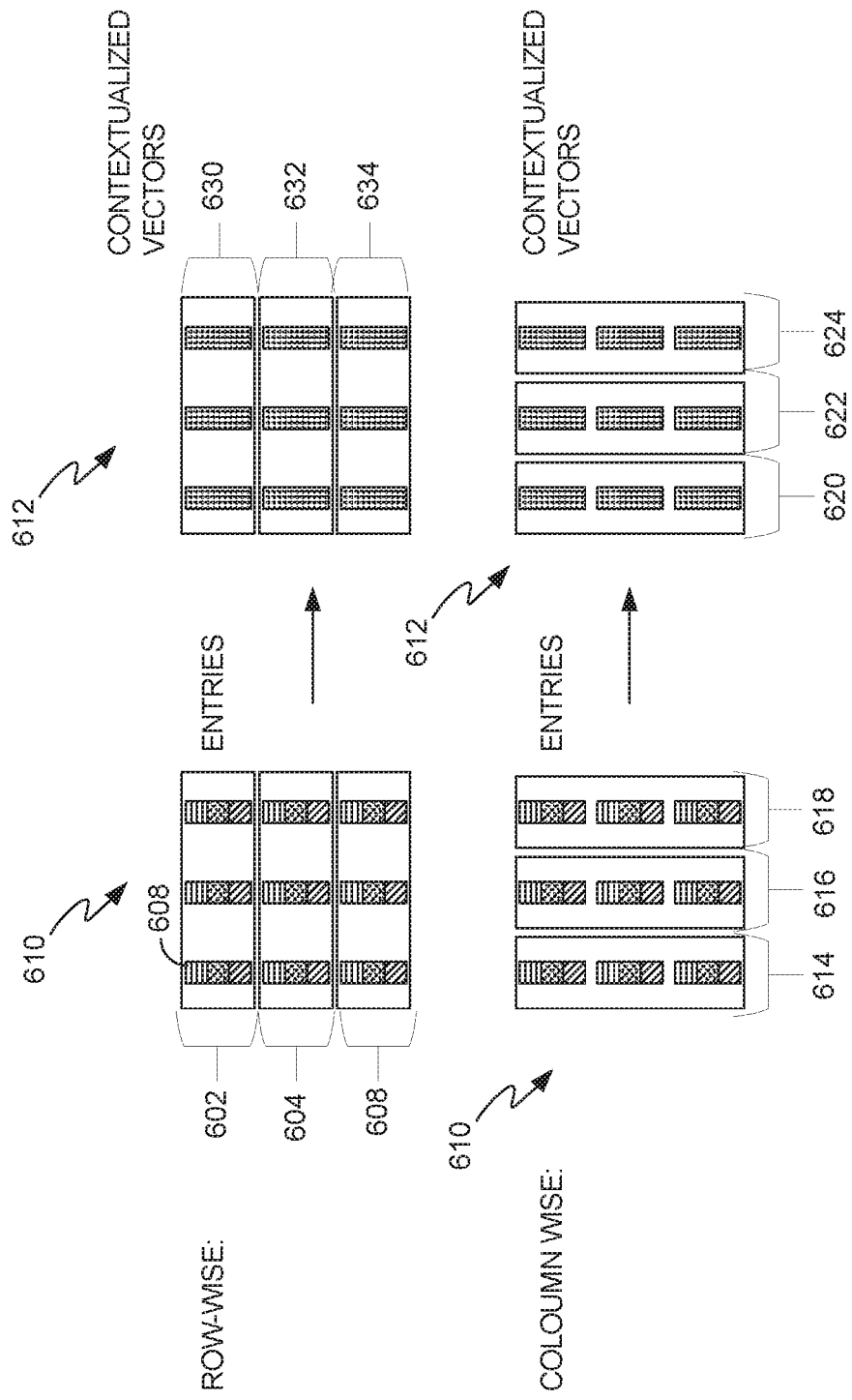
FIG. 6 is a schematic diagram that illustrates processing an entire object of entries representing a table into corresponding contextualized vectors, according to some embodiments.

FIG. 6 is a schematic diagram that illustrates processing an entire object of entries representing a table into corresponding contextualized vectors, according to some embodiments. In some embodiments, FIG. 6 represents the functionality as described with respect to the column-row model/layer 311, the row-column model/layer, the concatenation model/layer 315, the column-row feature aggregation component 211, the row-column feature aggregation component 213, and/or the concatenation component 214. In some embodiments, the feature vector (i.e., the entry 608) represents the entry 408 of FIG. 4 and/or the entry 502 of FIG. 5. Likewise, in some embodiments, the row 602 and/or the column 614 (and/or any other row or column) represents the group of embedding vectors 504 of FIG. 5. In some embodiments, FIG. 6 illustrates that functionality can generalize the 1D BiLSTM to 2D BiLSTM that take in 2D data. The intake of the 2D data can be either row-wise as illustrated in FIG. 6 or column wise as illustrated in FIG. 6.

For the "row-wise" processing, embodiments encode each row (i.e., rows 602, 604, and 608) of the object 610 into a corresponding set of contextualized vectors 612. In various embodiments, a machine learning model simultaneously or in parallel reads the object 610 in rows and converts each row of the object into a corresponding contextualized vector. For example, at a first time, a 2-dimensional bi-directional LSTM model may first encode the feature vectors 602 representing each cell of each row (e.g., a list of names) into the contextualized vector 630. At a second time subsequent to the first time, the 2-dimensional bi-directional LSTM model may encode the feature vector 604 representing each cell of each row into the contextualized vector 632.

For the "column-wise" processing, embodiments encode each column (i.e., columns 614, 616, and 618) of the object 610 into a corresponding set of contextualized vectors 612. In various embodiments, a machine learning model reads the object 612 in columns and converts each column of the object 612 into a corresponding contextualized vector. For example, at a first time, a 2-dimensional bi-directional LSTM model may first encode the feature vectors 614 representing each cell of each row (e.g., a list of names) into the contextualized vector 620. At a second time subsequent to the first time, the 2-dimensional bi-directional LSTM model may encode the feature vector 616 representing each cell of each column into the contextualized vector 622.

FIGS. 7A through 7D are schematic diagrams that represents the feature types from a table that are extracted and aggregated and how they are aggregated, according to some embodiments. In FIG. 7A, the entry 703 represents an individual cell and its contents that has been encoded into a feature vector. For example, for the string "USA," a word vector, shape vector, and POS vector can be generated and then encoded into an entry, as described in FIG. 4. In some embodiments, the entry 703 represents functionality performed by the element feature representation component 205, an element of the object model/layer 305, and the like.

FIG. 7B illustrates the converting or encoding of multiple entries from the same row 705 as element 703 into a contextualized vector. For example, a 1-dimensional LSTM model may sequentially read (or read in parallel/simultaneously) and encode the row 705 corresponding to the entries (e.g., POS tag, lemmatization, shape) of John D, USA, and Italy respectively into a larger feature vector. For example, the output can be the following contextualized vector (represented in English for clarity, as opposed to vectors): [John D, Proper noun, [letter, letter, letter, letter, letter]; USA, noun, [letter, letter, letter]; Italy, noun [letter, letter, letter, letter, letter]]. In some embodiments, FIG. 7B represents functionality described with respect to the row feature aggregation component 207, the row model/layer 307, and or the functionality described with respect to FIG. 5.

FIG. 7C illustrates the converting or encoding of multiple entries from the same column 709 as element 703 into a contextualized vector. For example, a 1-dimensional LSTM model may sequentially read (or read in parallel/simultaneously) and encode the row 709 corresponding to the entries (e.g., POS tag, lemmatization, shape) of "birthplace," "USA," and "Canada" respectively into a larger feature vector. For example, the output can be the following contextualized vector (represented in English for clarity, as opposed to vectors): [birth, place, noun, [letter, letter, letter, letter, letter, letter, letter, letter, letter, letter]; USA, noun, [letter, letter, letter]; Canada, noun [letter, letter, letter, letter, letter, letter]]. In some embodiments, FIG. 7C represents functionality described with respect to the column feature aggregation component 209, the column 309, and/or the functionality described with respect to FIG. 5.

FIG. 7D and FIG. 7E illustrate the converting or encoding of multiple entries from different columns and rows as element 703 into a contextualized vector (i.e., each entry of the table 700). For example, for FIG. 7D, a 2-dimensional LSTM model may first sequentially (or read in parallel) read and encode the rows 711, 705, and 713 into a feature vector that represents all of the rows of the table 700 and then encode the columns 715, 717, and 719. In another example, for FIG. 7E, a 2-dimensional LSTM model may first sequentially read (or read in parallel) and encode columns 715, 717, and 719 into a feature vector that represents all of the columns of the table 700 and then encode rows 711, 705, and then 713. In some embodiments, FIG. 7D represents functionality described with respect to the column-row feature aggregation component 211, the column-row model/layer 311 and/or FIG. 6. In some embodiments, FIG. 7E represents functionality described with respect to the row-column feature aggregation component 213 the row/column model/layer 313, and/or FIG. 6.

FIGS. 8A through 8D are schematic diagrams that represents how information is passed between each entry of a table when the table is analyzed and encoded, according to some embodiments. In some embodiments, the table 800 represents the same table 700 described with respect to FIGS. 7A through 7E. In FIG. 8A, the entry 803 represents an individual cell and its contents that has been encoded into a feature vector. In some embodiments, the entry 703 represents functionality performed by the element feature representation component 205, an element of the object model/layer 305, and the like.

FIG. 8B illustrates the converting or encoding of multiple entries from the same row (e.g., row 705) as entry 803 (which may represent entry 703) into a contextualized vector. Specifically, the feature values of entry 805 and 807 are consolidated or aggregated to the entry 803. FIG. 8C illustrates the converting or encoding of multiple entries from the same column (e.g., column 709) as element 803 into a contextualized vector. Specifically, the feature values of entry 809 and 811 are consolidated or aggregated to the entry 803.

FIG. 8D and FIG. 8E illustrate the converting or encoding of multiple entries from different columns and rows as element 803 into a contextualized vector (i.e., each cell of the table 800). Specifically, FIG. 8D illustrates the pass of information from the entire table 800 to the entry 803. In some embodiments, the functionality that occurs in FIG. 7D is represented by the functionality described with respect to FIG. 8D. FIG. 8D indicates a first order pas of information and a second order pass of information. Specifically, the first order pass of information (i.e., the encoding, reading, and/or processing of information that occurs first) occurs when: the feature values of the entries 813 and 815 are encoded or passed to the entry 809, the feature values of the entries 805 and 807 are encoded or passed to the entry 803, and the feature values of the entries 817 and 819 are encoded or passed to the entry 811. Continuing with FIG. 8D, the second order pass of information (i.e., the encoding, reading, and/or processing of information that occurs last or at a second time subsequent to the first time) occurs when: the feature values of the updated entries 809 and 811 are encoded or passed to the entry 803. In this way, each feature value of each entry or cell is concatenated to a single entry (e.g., as described by the column-row feature aggregation component 211).

FIG. 8E illustrates the pass of information from the entire table 800 to the entry 803. In some embodiments, the functionality that occurs in FIG. 7E is represented by the functionality described with respect to FIG. 8E. FIG. 8E indicates a first order pass of information and a second order pass of information. Specifically, the first order pass of information (i.e., the encoding, reading, and/or processing of information that occurs first) occurs when: the feature values of the entries 813 and 817 are encoded or passed to the entry 805, the feature values of the entries 809 and 811 are encoded or passed to the entry 803, and the feature values of the entries 815 and 819 are encoded or passed to the entry 807. Continuing with FIG. 8E, the second order pass of information (i.e., the encoding, reading, and/or processing of information that occurs last or at a second time subsequent to the first time) occurs when: the feature values of the updated entries 805 and 807 are encoded or passed to the entry 803. In this way, each feature value of each entry or cell is concatenated or aggregated to a single entry (e.g., as described by the row-column feature aggregation component 213).

Figure 9:
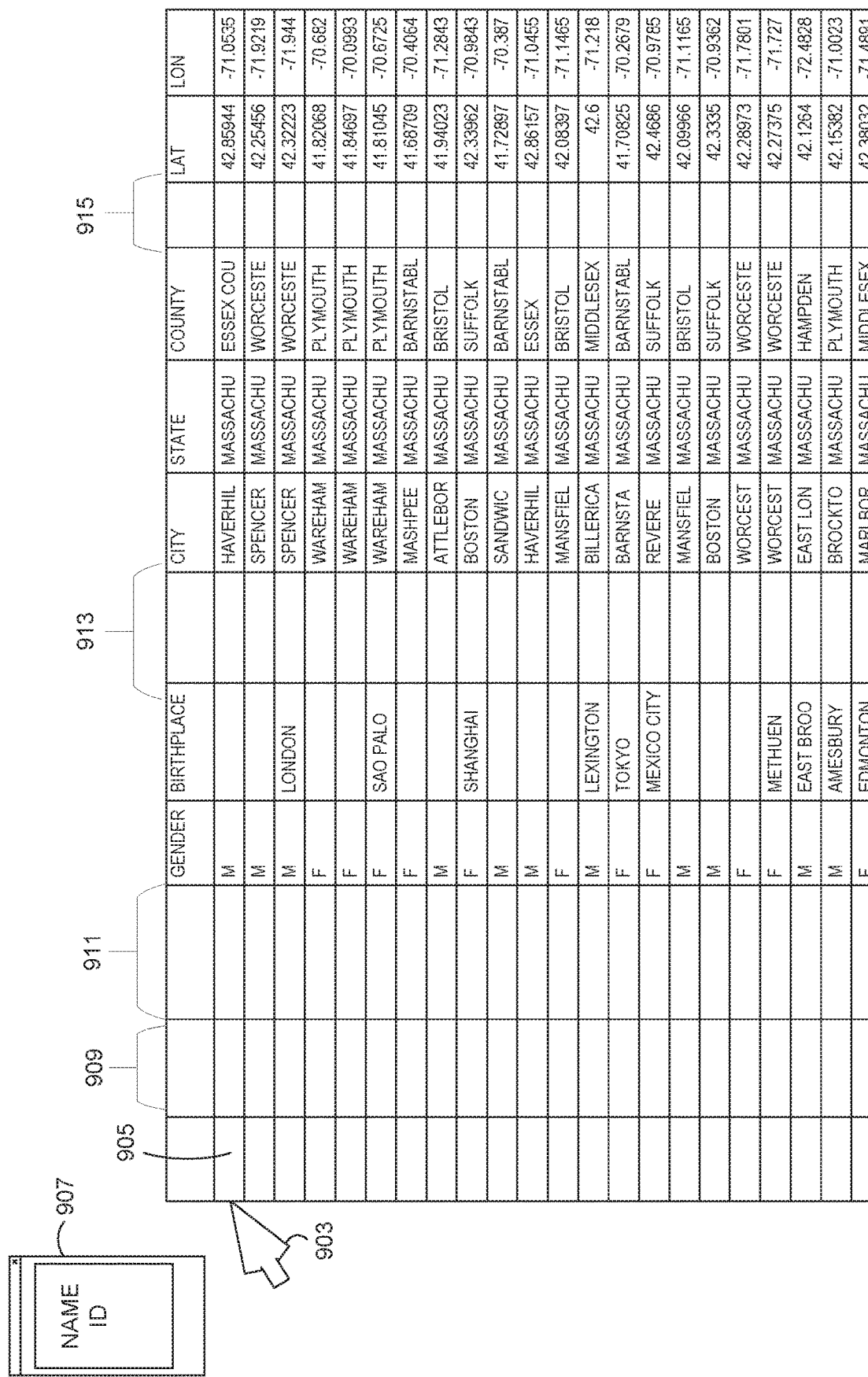
FIG. 9 illustrates an example screenshot of a user interface, according to some embodiments.

FIG. 9 illustrates an example screenshot of a user interface, according to some embodiments. The table 900 illustrates various cells and columns that have been encrypted, obfuscated, masked, or otherwise not visible due to their sensitive nature. In some embodiments, the table 900 represents the final output of the processes described herein. For example, in some embodiments, the table 900 represents the output as provided by the presentation component 200. In some embodiments, the table 900 represents the table 317 as indicate in FIG. 3.

FIG. 9 specifically illustrates that in response to receiving an indication of a user drag of the mouse pointer 903 over the cell 905, a pop-up window 907 is caused to be displayed. The pop-up window 907 reads "name ID" This indicates that the actual cell content has been obfuscated or masked. For instance, the actual content of the cell may be "John Doe." However, as described herein, certain information may be deemed to be too sensitive to display, such as names, since they can be linked to other sensitive information, such as address, types of confidential medical conditions, and the like. In some embodiments, "name ID" represents or indicates decision statistic, as described for example with respect to the decision statistic component 215. For example, in response to the concatenation component 214 performing its functionality for cell 905, it can be predicted that the "John Doe" contents (and specifically its entry feature values) belongs to the class if "name ID." Accordingly, particular embodiments cause this to be displayed.

FIG. 9 additionally includes other columns and cells that are not viewable and that are classified to be sensitive in some way. Some embodiments may make predefined labels or classes for each class of sensitive information, such as social security number, passport number, driver's license number, and/or the like. Accordingly, when particular embodiments determine that a cell's contents belongs to one of these sensitive information classes, embodiments can encrypt, obfuscate, mask, or otherwise not display its corresponding contents. For example, with respect to FIG. 9, all of the cells in column 907 may correspond to specific social security numbers of individuals. Accordingly, each of these cells can be encrypted, masked, obfuscated or otherwise not displayed. Likewise, all of the cells in column 911 may correspond to specific driver license numbers. And all of the cells in column 915 may correspond to passport numbers.

Column, 913 illustrates that in some embodiments, only certain cell content is displayed, while other cell content of the same column 913 is encrypted, obfuscated, masked, or otherwise not shown. In these instances, embodiments can use intelligent rules, such as only classifying information as sensitive if a birthplace is in the United States, while not classifying information as sensitive if the birthplace is outside of the United States. Accordingly, as illustrated in the column 913, the cell content of countries outside of the United States (e.g., Shanghai) are displayed, while other cells are not displayed (e.g., because the birthplace is the united states).

FIG. 10 is a schematic diagram illustrating how vectors are directionally or sequentially encoded (e.g., across rows and/or columns) using a Long Short Term Memory (LSTM)

model 1000, according to some embodiments. In some embodiments, the LSTM 1000 represents the functionality derived from or performed by the following components described herein: the row feature aggregation component 207, the column feature aggregation component 209, the column-row feature aggregation component 211, the row-column feature aggregation component 213, the concatenation component 214, the row/model layer 307, the column model/layer 309, the column-row model/layer 311, the row/column model/layer, the concatenation model/layer 315, the functionality performed in FIG. 5, FIG. 6, FIG. 7A-7D, and/or FIG. 8A-8E. Although FIG. 10 illustrates an LSTM, it is understood that this is illustrative only and that any quantity or type of suitable components can exist. For example, in some embodiments, other models (e.g., an CNN or HMM) can be alternatively used instead of an LSTM.

FIG. 10 illustrates how feature vectors can be aggregated and concatenated sequentially. The LSTM model function assumes that a downstream event (or later-in-time event, such as a last cell feature of a row) depends upon, and is a function of, one or more events that came before (e.g., a previous cell feature of the same row). In other words, LSTM is a model that shares weights over time. In a table encoding context, the model can learn cell feature patterns over time based on past cell feature observations (e.g., determine that the first three cells of a row indicate specific names, so the next cell of the same row is likely to be a name as well, which is indicative of a sensitive classification).

Element or cell 1001 represents a feature vector representing the feature values of an entry, table cell, or other element. In an illustrative example, the cell 1001 may represent an entry (e.g., the entry 408), which includes word vector values, shape vector values, and a POS vector values, as described with respect to FIG. 4. The cell state 1003 corresponds to selective memory of past cell states (i.e., it takes data (e.g., vector values) that has been forgotten or disregarded and data that has been remembered or preserved) and passes on remembered data to the next cell or step (e.g., a next entry corresponding to a next cell in a column). When data arrives at the last cell (e.g., representing the last table cell in a particular column), $C_t$ is linearly combined with $h_{t+1}$ such that $h_{t+1}$ is the final output.

In various embodiments, the first operation occurs when the forget gate layer 1005 (a sigmoid layer) determines what vector values gets removed from the cell state 1003, as represented by $f_t=\sigma(W_f\cdot[h_{t-1},x_t]+b_f)$. It takes $h_{t-1}$ (e.g., the previous cell state corresponding to previous feature values in a previous table cell) and $x_t$ (current vector values) and outputs a number between 0 and 1. A value close to or within a threshold of value of 1 indicates true or keep this data while a 0 or value within a threshold value of 0 indicates forget or get rid of the data. A previous cell state indicates at least a portion the vector values that were passed from the previous cell, as opposed to the overall cell state that indicates at least a portion the data that was passed for at least a portion of cells up until a particular point.

In various embodiments, the next operation is to determine what information will be stored or moved along the cell state 1003, as represented by $i_t=\sigma(W_i\cdot[h_{t-1},x_t]+b_i)$; $\tilde{C}_t=\tanh(W_C\cdot[h_{t-1},x_t]+b_C)$. This occurs via the input gate layer 1007 (another sigmoid layer) and the tanh layer 1009. The gate layer 1007 determines which vector values will be updated and the tanh layer 1009 generates a single vector of new candidates $C_t$. In an example illustration, embodiments can forget table entry feature values or vector representations that are: duplicative, noisy, are below and/or above some threshold, such as surpassing a number of predefined words or other character sequence, and/or contain extraneous information not analyzed or encoded, such as certain symbols and the like.

Certain embodiments then update the old cell state 1003 ($C_{t-1}$) into the new cell state $C_t$, as represented by $C_t = f_t*C_{t-1}+i_t*\tilde{C}_t$. Accordingly, the old cell state ($C_{t-1}$) is multiplied by 1005, forgetting the vectored values described above. Then, the input gate layer 1007*the tanh layer 1009 is added. In the last step, it is determined what is outputted, which is represented by $o_t=\sigma(W_o\ [h_{t-1},x_t]+b_o)$; $h_t=o_t*\tanh(C_t)$. The output is based on the new cell state Cr, which is a filtered version of the cell state. A sigmoid layer determines what parts of the cell state 1003 ($C_{t\_}1$) will be output. The cell state 1003 is run through tanh so that the values are between −1 and 1, represented by the final output $h_{t+1}$. And this is multiplied by the sigmoid gate 411 so only the necessary values are outputted. In various embodiments, the final output $h_{t+1}$ includes a concatenated feature vector or contextualized vector that aggregates some or each table cell feature values of one or more rows and/or columns, as described herein. For example, the output can be a concatenated feature vector that represents each entry of a particular row. In a 2-dimensional context, this functionality can be repeated for different sequences, such as rows and columns. Accordingly, the output of the cell 1001 (assuming that this is the last portion of the utterance/voice segment) is a single vector where each value of the vector is a non-binary (e.g., float, integer, decimal) between −1 and 1.

Figure 11:
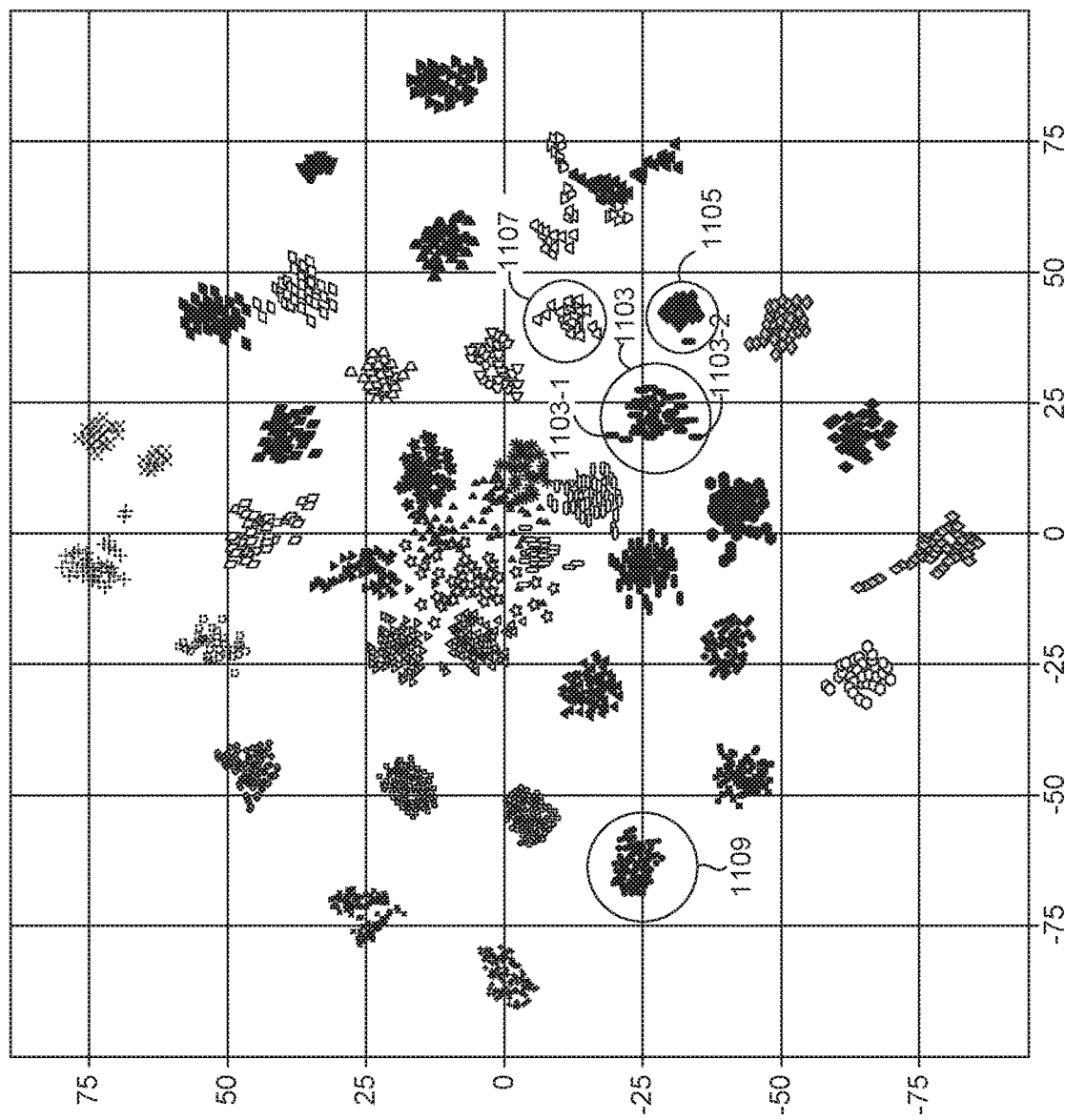
FIG. 11 is a schematic diagram of an example visualization of a feature space that illustrates various feature vectors representing one or more table elements and classes, according to some embodiments.

FIG. 11 is a schematic diagram of an example visualization of feature space 1100 that illustrates various feature vectors representing one or more table elements and classes, according to some embodiments. In some embodiments, the feature space 1100 represents the functionality used by the decision statistic component 215 to determine what class a particular feature vector belongs to. In some embodiments, the feature space 1100 represents any feature space described herein and takes as input one or more concatenated contextualized vectors (e.g., as encoded by the LSTM 1000) in order to provide a classification output.

In some embodiments, the feature space 1100 includes classes of data points (e.g., data point 1103-1 and data point 1103-2) representing individual feature vectors corresponding to specific entries, tables cells, and/or tables. These data points are formed together to form a particular class. For example, the data point 1103-1 and data point 1103-2 have been classified as "social security number" 1103 (indicative that the feature values of the data points 1103 are within a threshold distance to or similar to other trained data points). There are other classes, such as class 1105 (e.g., "passport number") and the class 1107 (e.g., "name ID").

In an illustrative example of how the feature space 1100 is used, embodiments may receive a table of entries to analyze a class of a first table cell. Responsively, some embodiments run the first table cell through one or more machine learning models in order to weight features (e.g. POS) for the first table cell, after which a feature vector (e.g., representing the data point 1103-1) is embedded in the feature space 1100. The feature space 1100 in various embodiments represents a multidimensional coordinate system where each feature is associated with one or more dimensions. For example, a first set entries may be plotted where a first axis represents a POS value and the second axis represents lemmatization values. Each feature value within the feature vector may be summed or otherwise aggregated to arrive at a final coordinate point (e.g., the data point 1103-2) within the feature space 1100. Each of the data points within the class 1103, for example, are within a feature similarity threshold and so they are close to each other (e.g., based on Euclidian distance) in the feature space 1100. Responsive to the embedding of the feature vector in the feature space 1100, embodiments classify the first set of entries. For example, if a first contexualized vector represents data point 1103-1, then the classification that is nearest to the data point 1103-1 is the "social security number" Classification 1103 indicative of the first entry containing social security information.

The machine learning model(s) are able to cluster samples of new unseen table element contents (e.g., any table cell received after training). In some embodiments, every table elements or set of table elements is represented by the median of its samples' embeddings as shown below:

$$C_j = \text{median}\{f_{embed}(S_i^j): I=1,2,\ldots,n\]$$

Where $f_{embed}$ is the output of the model, $S_i^j$ is the $i^{th}$ sample of the $j^{th}$ class. The prediction for any test sample X is given by:

$$Pred(X) = \arg\min_j \|C_j - f_{embed}(X)\|.$$

However, it is understood that median is just one way to represent an embedding. Some embodiments alternatively use other statistics like mean, pth percentile, and the like.

Figure 12:
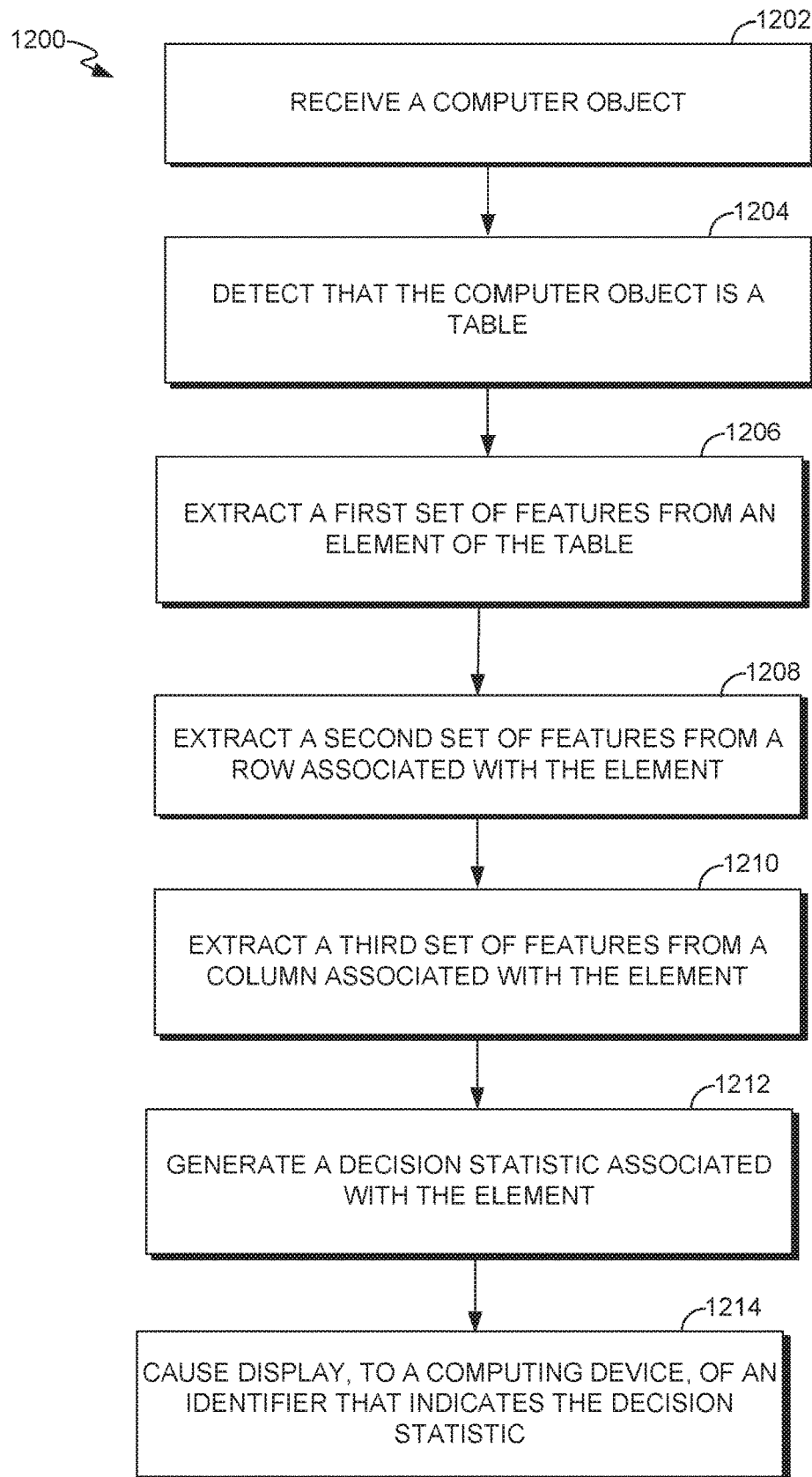
FIG. 12 is a flow diagram of an example process for causing display of an identifier that indicates a decision statistic, according to some embodiments.

Turning now to FIG. 12, a flow diagram of an example process 1200 for causing display of an identifier that indicates a decision statistic, according to some embodiments. The process 1200 (and/or any of the functionality described herein, such as process 1300) may be performed by processing logic that comprises hardware (e.g., circuitry, dedicated logic, programmable logic, microcode), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments the process 1200 does not include blocks 1202, 1204, 1208, and/or 1210. Any added blocks may include blocks that embody any functionality described herein (e.g., any of the blocks described by the process 1300 of FIG. 13) The computer-implemented method, the system (that includes at least one computing device having at least one processor and at least one computer readable storage medium), and/or the computer storage media as described herein may perform or be caused to perform the processes 1200 or any other functionality described herein.

Per block 1202, a computer object is received. The term "computer object" or "object" as described to herein refers to any data structure, file, a set of code/instructions, one or more messages, one or more fields, and/or any other suitable set of information. In an illustrative example of block 1202, the table recognition component 203 can receive: a spreadsheet document that includes one or more tables (e.g., a spreadsheet table, a matrix, or other 2-dimensional array), along with values for each cell in the one or more tables. Per block 1204, particular embodiments detect that the computer object is a table. For example, as described with respect to FIG. 1, the table recognition component 203 can use a bounding box and object detection functionality to detect the boundaries of a table.

Per block 1206, a first set of features are extracted from an element (e.g., a cell or group of cells) of the table. The term "extract" as described herein refers to tagging data supplementing data, changing data, formatting data, and/or obtaining information about data. In some embodiments, the firsts set of features can be or include at least one of: a lemmatization of each word within the cell, a character type for each character in the cell, and a part-of-speech tag for each word in the cell. For example, these first set of features are described with respect to FIG. 4 and the element feature representation component 205.

In some embodiments, block 1206 includes deriving a first feature vector that represents the first set of features based at least in part on the extracting. The term "deriving" can mean either receiving from a model or generating. In an illustrative example of block 1206, the derivation of the first feature vector is described with respect to the element feature representation component 205 where a set of natural language segments can be extracted and encoded into feature vector of integers or other real numbers that represent the natural language segments. In some embodiments, this first feature vector can be represented by any feature vector described with respect to FIG. 4, such as the "word vector 402" or the entry 408. In some embodiments, the deriving of the first feature vector includes concatenating a plurality of sub-vectors into the first vector, where each of the plurality of sub-vectors represent an individual feature (or feature value) of the cell. For example, this is described with respect to FIG. 4, where the sub-vectors are representing by the word vector 402 (a first sub-vector), the shape vector 404 (a second sub-vector), and the POS vector 406 (a third sub-vector) and the concatenated first vector represents the entry 408.

Per block 1208, a second set of features are extracted from a row associated with the element. The row includes a first plurality of cells (at least two but need not be an entire row of a table). For example, each cell of a first row and its content can be extracted (e.g., a first record that reads, "John Doe (a first cell), USA (a second cell), and Italy (a third cell) similar to the table described in FIG. 7A). A "row" can include two or more cells that are horizontally oriented relative to each other.

In some embodiments, based at least in part on the extracting of the second set of features, block 1208 includes deriving a second feature vector that represents at least a portion of the second set of feature vectors as described with respect to the row feature aggregation component 207, the column-row feature aggregation component 211, the row-column feature aggregation component 213, and/or the concatenation component 214. In some embodiments, the row is included in a same row as the element, wherein the deriving of the second feature vector includes performing, via a machine learning model, a contextual linear operation on a set of objects that represent each (or a portion of) cell in the row of the table, and wherein the contextual linear operation is performed in a sequential order across the set of objects. A "contextual linear operation" as described herein refers to any linear operation that is performed on multiple feature vectors of a table or performed in a sequential (i.e., ordered) manner. For example, a contextual linear operation can be $i_t = \sigma(W_i \cdot [h_{t-1}, x_t] + b_i)$; $\tilde{C}_t = \tanh(W_C \cdot [h_{t-1}, x_t] + b_C)$ or any other function performed by a LSTM or other machine learning model. Block 1208 is described for example, with respect to the row model/layer 307, the row feature aggregation component 207, FIG. 5, FIG. 7B, FIG. 8B, and the LSTM 1000 of FIG. 10. Put a different way, particular embodiments sequentially encode, via one or more machine learning models and a first contextual linear operation, the second set of features into a feature vector (e.g., a contextualized vector) based on the extracting of the second set of features.

In some embodiments, however, the row is included in a different row as the element, such that embodiments perform, via a machine learning model, a contextual linear operation on a set of objects that represent each (or some) cell in the row of the table, and wherein the contextual linear operation is performed a sequential order across the row. For example, this is described in different ways with respect to the column-row feature aggregation component 211, the row-column feature aggregation component 213, the concatenation component 214, the column-row model/layer 311, the row-column model/layer, the concatenation layer 315, FIG. 5, the "row-wise" functionality of FIG. 6, FIGS. 7D and 7E, FIGS. 8D and 8E, and/or the LSTM 1000 of FIG. 10. In various embodiments, the one or more machine learning models described herein include a bidirectional LSTM Recurrent Neural Network (e.g., a 1-dimensional or 2-dimensional one). Some embodiments sequentially encode, via the one or more machine learning models, the second set of features into the feature vector by performing a first contextual linear operation to generate a first set of feature vectors that represent first features of each cell in each row of the table. This is described, for example, with respect to the "row-wise" functionality of FIG. 6. In some embodiments, "sequentially encode" means to encode information in some particular order, such as encoding each cell in a row of a table from left to right.

Per block 1210, some embodiments extract a third set of features (which can include all or some of the second set of features) from a column associated with the element. The column includes a second plurality of cells (at least two but need not be an entire column of a table). For example, each cell of a first column and its content can be extracted (e.g., a first column that reads, "Birth place" (a first cell), "USA" (a second cell), and "Canada" (a third cell) similar to the table described in FIG. 7A). A "column" can include two or more cells (also referred to as "fields") that are vertically oriented relative to each other. In some embodiments, the cell from the extracted third set of features (or extracted second set of features) need not be (or include) a header cell (e.g., a header cell of the element or in the same column as the element). A "header cell" as described herein is a cell that indicates the type, category, or class of information that is contained in the rest of the column (or row) to which the header cell belongs to. Header cells are typically oriented as a top-most cell and below the top cell are all other cells that belong to the header cell or are individual instances of the header cell. For example, a header cell may read "birthplace." Below this header cell, the rest of the column may specific individual instances (cells) of "birthplace," such as "USA," "Italy," "France," and the like.

In some embodiments, based at least in part on the extracting of the third set of features, block 1210 includes deriving another feature vector that represents at least a portion of the third set of feature vectors as described with respect to the column feature aggregation component 209, the column-row feature aggregation component 211, the row-column feature aggregation component 213, and/or the concatenation component 214.

In some embodiments, the column is included in a same column as the element, and wherein the deriving of the third set of feature vectors includes performing, via a machine learning model, a contextual linear operation on a set of objects that each represent each cell in the column of the table. This is described for example, with respect to the column model/layer 309, the column feature aggregation component 209, FIG. 5, FIG. 7C, FIG. 8C, and the LSTM 1000 of FIG. 10. Put a different way, particular embodiments sequentially encode, via one or more machine learning models and a first contextual linear operation, the second set of features into a feature vector (e.g., a contextualized vector) based on the extracting of the second set of features.

In some embodiments, however, the column is included in a different column as the element, such that embodiments perform, via a machine learning model, a contextual linear operation on a set of objects that represent each (or some) cell in the column of the table, and wherein the contextual linear operation is performed a sequential order across the column. For example, this is described in different ways with respect to the column-row feature aggregation component 211, the row-column feature aggregation component 213, the concatenation component 214, the column-row model/layer 311, the row-column model/layer, the concatenation layer 315, FIG. 5, the "column-wise" functionality of FIG. 6, FIGS. 7D and 7E, FIGS. 8D and 8E, and/or the LSTM 1000 of FIG. 10. Some embodiments sequentially encode, via the one or more machine learning models, the second set of features into the feature vector by performing a first contextual linear operation to generate a first set of feature vectors that represent first features of each cell in each column of the table. This is described, for example, with respect to the "column-wise" functionality of FIG. 6.

Per block 1212, particular embodiments generate a decision statistic associated with the element. This decision statistic can be generated based at least in part on the deriving of the first feature vector and the deriving of the second feature vector (or any other feature vector described herein). For example, particular embodiments generate a decision statistic as described with respect to the decision statistic component 215 and/or the feature space 1100 of FIG. 11. In some embodiments, the decision statistic is indicative of classifying whether the cell includes a particular type of sensitive information or Personally Identifiable Information (PII), as described for example with respect to FIG. 9. In some embodiments, the decision statistic is indicative of classifying whether the element is at least one of: a social security number, a birth date, an ethnicity, a race, an ID, a driver's license number, and a passport number, as described, for example, with respect to FIG. 9. In some embodiments, the generating of the decision statistic is based on performing a first contextualized linear operation and/or a second contextual linear operation. For example, some embodiments can sequentially encode, via one or more machine learning models, the second set of features into a feature vector and based at least in part on the first set of features and the sequential reading, the decision statistic is generated. This is described, for example, in FIG. 10 and FIG. 11, where an LSTM 1000 first sequentially encodes data, and then a prediction is made with respect to FIG. 11, such as the class of information contained in a particular cell. In some embodiments, this decision statistic is alternatively or additionally another prediction, such as predicting whether the element fits within a "to-be-shown" classification or "not to be shown" (e.g., because of one or more rules specifying what specific information to show or not show). In yet other embodiments, this decision statistic is alternatively or additionally a prediction whether certain information belongs to a particular genus or category of information, such as "sensitive," "not sensitive," "information that contains a name" and/or the like. Accordingly, one or more rules may exist to display or obfuscate, "information that contains a name" (e.g., a patient indicated in a first cell, a doctor of the patient indicated in the same row) or other "sensitive" information.

Per block 1214, some embodiments cause display, to a computing device (e.g., the user device 102a), an identifier that indicates the decision statistic. This is described with respect to the presentation component 220 of FIG. 2, the output table 317, and FIG. 9. For example, the identifier can include an indication that the cell includes the particular type (e.g., whether it's a social security number, passport number, driver's license number, etc.) of sensitive information based on the classifying, as described with respect to FIG. 9. Some embodiments cause a computing device to obfuscate a value of the cell for display based at least in part on the generating of the decision statistic. To "obfuscate" means to modify data (e.g., content and/or metadata) from one form to another so as make something difficult to understand, such as changing a first value to a second value different than the first value. In some embodiments obfuscation includes, encryption, masking, and/or deleting data. For example, obfuscation may include stripping out revealing metadata, renaming values to meaningless labels, or partially encrypting values. In an illustrative example, of obfuscation, the word "USA" can be renamed to "birthplace" such that "birthplace" is displayed rather than "USA."

Figure 13:
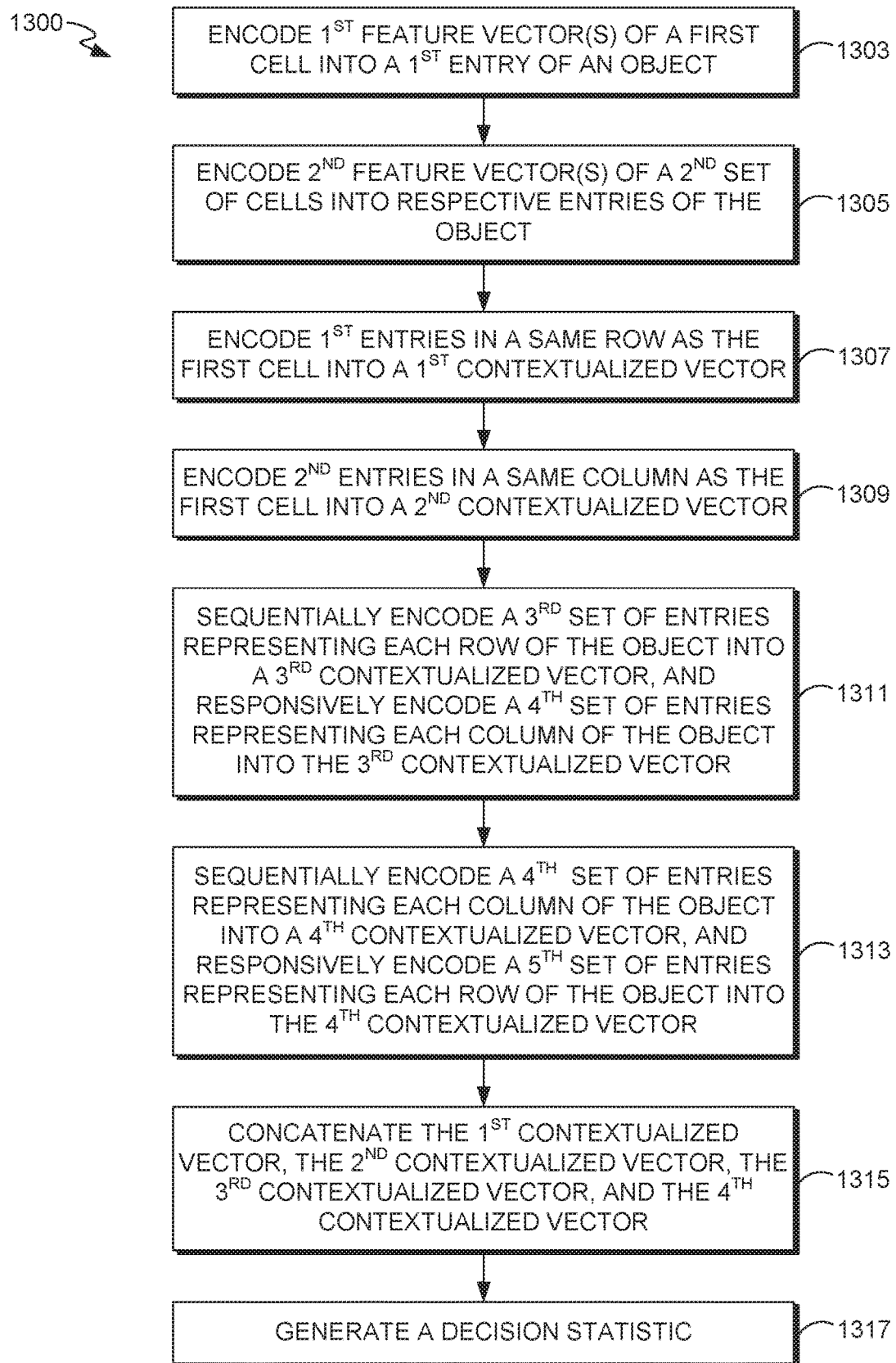
FIG. 13 is a flow diagram of an example process for generating a decision statistic, according to some embodiments.

FIG. 13 is a flow diagram of an example process 1300 for generating a decision statistic, according to some embodiments. In some embodiments, some or each of the blocks in the process 1300 is included in the process 1200 of FIG. 12. Per block 1303, a first set of feature vectors of a first cell are encoded into a first entry of an object. Examples of this functionality is described with respect to FIG. 4, FIG. the element feature representation component 205, FIG. 7A, and FIG. 8A. The term "encode" as described herein means to convert, change, represent, aggregate, concatenate, and/or the like a first set of data into (or as) another set of data.

Per block 1305, particular embodiments encode a second set of feature vectors of a second set of cells into respective entries of the object. In an illustrative example, each feature vector representing one or more features of each cell of a table besides the first cell can be aggregated into an entry, similar to FIG. 4. Examples of this are described with respect to the functionality of the object/model layer 305 and the element feature representation component 205.

Per block 1307, particular embodiments encode a first set of entries in a same row as the first cell into a first contextualized vector. Examples of this are described with respect to the functionality of the row feature aggregation component 207, the row/model layer 307, FIG. 5, FIG. 7B, FIG. 8B, and the LSTM 1000 of FIG. 10.

Per block 1309, particular embodiments encode a second set of entries in a same column as the first cell into a second contextualized vector. Examples of this are described with respect to the functionality of the column feature aggregation component 209, the column/model layer 3079, FIG. 5, FIG. 7C, FIG. 8C, and the LSTM 1000 of FIG. 10.

Per block 1311, particular embodiments encode a third set of entries representing each (or some) row of the object into a third contextualized vector, and responsively encode a fourth set of entries representing each (or some) column of the object into the third contextualized vector. Examples of this are described with respect to the functionality of the column-row feature aggregation component 211, the column-row model/layer 311, FIG. 6, FIG. 7D, FIG. 8D, and/or the LSTM 1000 encoding in multiple dimensions.

Per block 1313, particular embodiments encode a fifth set of entries representing each (or some) column of the object into a fourth contextualized vector, and responsively encode a sixth set of entries representing each (or some) row of the object into the fourth contextualized vector. Examples of this are described with respect to the functionality of the row-column feature aggregation component 213, the row-column model/layer 313, FIG. 6, FIG. 7E, FIG. 8E, and/or the LSTM 1000 encoding in multiple dimensions.

Per block 1315, particular embodiments concatenate the first contextualized vector, the second contextualized vector, the third contextualized vector, and the fourth contextualized vector. Examples of this are described with respect to the functionality of the concatenation component 214 and/or the concatenation model/layer 315. Per block 317, a decision statistic is generated (e.g., which includes the same functionality as block 1212).

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

Figure 14:
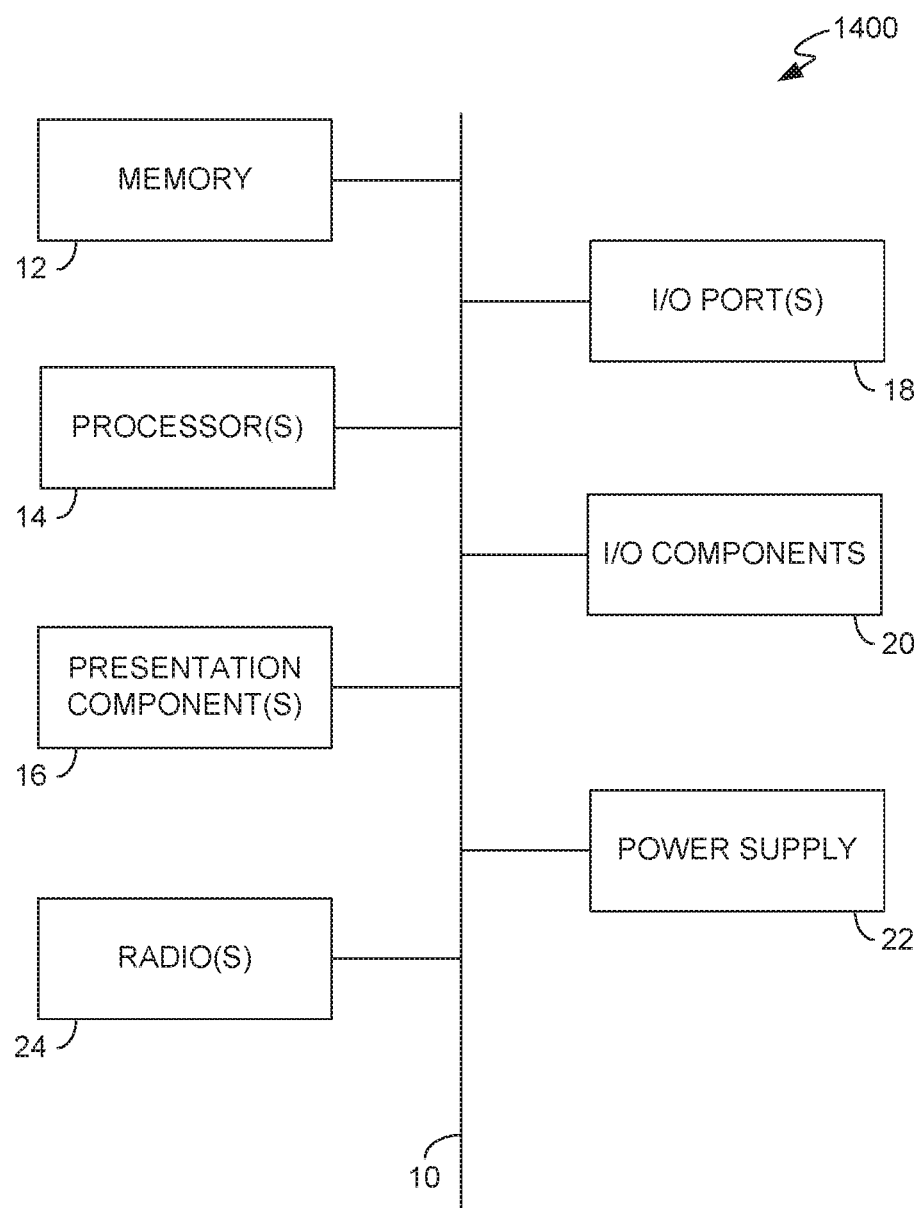
FIG. 14 is a block diagram of an exemplary computing device for use in implementing embodiments of the present disclosure.

With reference to FIG. 14, computing device 1400 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 14 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 14 is merely illustrative of an exemplary computing device that can be used in connection with one or more embodiments of the present disclosure. Distinction is not made between such categories as "workstation," "server," "laptop," "handheld device," etc., as each are contemplated within the scope of FIG. 11 and with reference to "computing device."

Computing device 1400 typically includes a variety of computer-readable media. Computer-readable media can be any available media that can be accessed by computing device 4100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1400. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 1400 includes one or more processors 14 that read data from various entities such as memory 12 or I/O components 20. Presentation component(s) 16 presents data indications to a user or other device. In some implementations presentation component 220 of system 200 may be embodied as a presentation component 16. Other examples of presentation components may include a display device, speaker, printing component, vibrating component, and the like.

The I/O ports 18 allow computing device 1400 to be logically coupled to other devices, including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1400. The computing device 1400 may be equipped with depth cameras, such as stereoscopic camera systems, infrared camera systems, RGB camera systems, and combinations of these, for gesture detection and recognition. Additionally, the computing device 1400 may be equipped with accelerometers or gyroscopes that enable detection of motion. The output of the accelerometers or gyroscopes may be provided to the display of the computing device 1400 to render immersive augmented reality or virtual reality.

Some embodiments of computing device 1400 may include one or more radio(s) 24 (or similar wireless communication components). The radio 24 transmits and receives radio or wireless communications. The computing device 1400 may be a wireless terminal adapted to receive communications and media over various wireless networks. Computing device 1400 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Clause 1. A computerized system comprising: one or more processors; and computer storage memory having computer-executable instructions stored thereon which, when executed by the one or more processors, implement a method comprising: extracting a first set of features from a first cell of a table; based at least in part on the extracting, deriving a first feature vector that represents the first set of features; extracting a second set of features from a row of the table, the second set of features describing data from multiple cells in the row; based at least in part on the extracting of the second set of features, deriving a second feature vector that represents at least a portion of the second set of features; based at least in part on the deriving of the first feature vector and the deriving of the second feature vector, generating a decision statistic for the first cell; and based at least in part on the decision statistic, causing a computing device to obfuscate a value of the first cell for display.

Clause 2. The system of clause 1, wherein the decision statistic is indicative of classifying whether the first cell includes a particular type of sensitive information.

Clause 3. The system of clause 2, the method further comprising causing a computing device display an indication that the first cell includes the particular type of sensitive information based on the classifying.

Clause 4. The system of clause 1, wherein the deriving of the first feature vector includes concatenating a plurality of sub-vectors into the first vector, each of the plurality of sub-vectors represent an individual feature of the first cell.

Clause 5. The system of clause 4, wherein the individual feature of the first cell is indicative of at least one of: a lemmatization of each word within the first cell, a character type for each character in the first cell, and a part-of-speech tag for each word in the first cell.

Clause 6. The system of clause 1, wherein the row is included in a same row as the first cell, and wherein the deriving of the second feature vector includes performing, via a machine learning model, a contextual linear operation on a set of objects that represent each cell in the row of the table, and wherein the contextual linear operation is performed in a sequential order across the set of objects.

Clause 7. The system of clause 1, wherein the column is included in a same column as the first cell, and wherein the deriving of the second feature vectors includes performing, via a machine learning model, a contextual linear operation on a set of objects that each represent each cell in the column of the table.

Clause 8. A computer-implemented method comprising: receiving a table; extracting a first set of features from an element of the table; extracting a second set of features from at least one of: each cell of a row of the table and each cell of a column of the table; encoding, via one or more machine learning models, the first set of features and the second set of features into a feature vector; and based at least in part on the encoding, generating a decision statistic associated with the element of the table.

Clause 9. The method of clause 8, wherein the decision statistic is indicative of classifying whether the cell is sensitive or not sensitive.

Clause 10. The method of clause 8, wherein the element is at least one of: a cell of the table and a plurality of cells of the table.

Clause 11. The method of clause 8, wherein the sequentially reading, via one or more machine learning models, a set of indications includes performing a first contextual linear operation to generate a first set of feature vectors that represent first features of each cell in each row of the table.

Clause 12. The method of clause 11, wherein the sequentially reading, via one or more machine learning models, a set of indications includes performing a second contextual linear operation to generate another set of vectors that each represent second features of each cell in each column of the table.

Clause 13. The method of clause 12, wherein the generating of the decision statistic is further based on the performing of the first contextual linear operation and the second contextual linear operation.

Clause 14. The method of clause 8, wherein the one or more machine learning models includes a Bidirectional Long Shorty-Term Memory Recurrent Neural Network.

Clause 15. One or more computer storage media having computer-executable instructions embodied thereon that, when executed, by one or more processors, cause the one or more processors to perform a method, the method comprising: extracting a first set of features from a first cell of a table; based at least in part on the extracting, deriving a first feature vector that represents the first set of features; deriving a second feature vector that represents a second set of features of each cell of a row that the first cell is in; deriving a third feature vector that represents a third set of features of each cell of a column that the first cell is in; deriving a fourth feature vector that represents each cell of the table by encoding each row of the table into the fourth feature vector and responsively encoding each column of the table into the fourth feature vector; deriving a fifth feature vector that represents each cell of the table by encoding each column of the table into the fifth vector and responsively encoding each row of the table into the fifth feature vector; and based at least in part on the deriving of: the first feature vector, the second feature vector, the third feature vector, the fourth feature vector, and the fifth feature vector, generating a decision statistic for the first cell.

Clause 16. The computer storage media of clause 15, wherein the decision statistic is indicative of classifying whether the element includes a particular type of sensitive information.

Clause 17. The computer storage media of clause 15, wherein the deriving of the first feature vector includes concatenating a plurality of sub-vectors into the first vector, each of the plurality of sub-vectors represent an individual feature of the cell.

Clause 18. The computer storage media of clause 15, wherein any individual feature of the first set of features is indicative of at least one of: a lemmatization of each word within the first cell, a character type for each character in the first cell, and a part-of-speech tag for each word in the first cell.

Clause 19. The computer storage media of clause 15, wherein any individual feature of the second set of features is indicative of at least one of: a lemmatization of each word within the row, a character type for each character in the row, and a part-of-speech tag for each word in the row.

Clause 20. The computer storage media of clause 15, wherein any individual feature of the second set of features is indicative of at least one of: a lemmatization of each word within the column, a character type for each character in the column, and a part-of-speech tag for each word in the column.

What is claimed is:

1. A computerized system comprising:
   one or more processors; and
   computer storage memory having computer-executable instructions stored thereon which, when executed by the one or more processors, implement a method comprising:
   extracting a first set of features from a first cell of a table;
   based at least in part on the extracting, deriving a first feature vector that represents the first set of features by encoding data from columns and rows of the table in a first order;
   extracting a second set of features from a row of the table, the second set of features describing data from multiple cells in the row;
   based at least in part on the extracting of the second set of features, deriving a second feature vector that represents at least a portion of the second set of features by iteratively encoding from the columns and the rows of the table in a second order, wherein the second order is different from the first order;
   based at least in part on the first feature vector and the second feature vector, generating a decision statistic for the first cell; and
   based at least in part on the decision statistic, causing a computing device to obfuscate a value of the first cell for display.

2. The system of claim 1, wherein the decision statistic is indicative of classifying whether the first cell includes a particular type of sensitive information.

3. The system of claim 2, the method further comprising causing a computing device display an indication that the first cell includes the particular type of sensitive information based on the classifying.

4. The system of claim 1, wherein the deriving of the first feature vector includes concatenating a plurality of sub-vectors into the first vector, each of the plurality of sub-vectors represent an individual feature of the first cell.

5. The system of claim 4, wherein the individual feature of the first cell is indicative of at least one of: a lemmatization of each word within the first cell, a character type for each character in the first cell, and a part-of-speech tag for each word in the first cell.

6. The system of claim 1, wherein the row is included in a same row as the first cell, and wherein the deriving of the second feature vector includes performing, via a machine learning model, a contextual linear operation on a set of objects that represent each cell in the row of the table, and wherein the contextual linear operation is performed in a sequential order across the set of objects.

7. The system of claim 1, wherein the row is included in a same row as the first cell, and wherein the deriving of the second feature vectors includes performing, via a machine learning model, a contextual linear operation on a set of objects that each represent each cell in the row of the table.

8. A computer-implemented method comprising:
receiving a table;
extracting a first set of features from an element of the table;
extracting a second set of features from at least one of: a row of the table and a column of the table;
encoding, via one or more machine learning models, the first set of features and the second set of features into a first feature vector by encoding data from all columns and all rows of the table in a first order;
deriving a second feature vector that represents each cell of the table by encoding multiple rows of the table into the second feature vector and responsively encoding multiple columns of the table into the second feature vector by iteratively encoding from all of the columns and all of the rows of the table in a second order, wherein the second order is different from the first order; and
based at least in part on the first feature vector and the second feature vector, generating a decision statistic associated with the element of the table.

9. The method of claim 8, wherein the decision statistic is indicative of classifying whether the cell is sensitive or not sensitive.

10. The method of claim 8, wherein the element is at least one of: a cell of the table and a plurality of cells of the table.

11. The method of claim 8, further comprising sequentially reading, via one or more machine learning models, a set of indications includes performing a first contextual linear operation to generate a first set of feature vectors that represent first features of each cell in each row of the table.

12. The method of claim 11, wherein the sequentially reading, via one or more machine learning models, a set of indications includes performing a second contextual linear operation to generate another set of vectors that each represent second features of each cell in each column of the table.

13. The method of claim 12, wherein the generating of the decision statistic is further based on the performing of the first contextual linear operation and the second contextual linear operation.

14. The method of claim 8, wherein the one or more machine learning models includes a Bidirectional Long Short-Term Memory Recurrent Neural Network.

15. One or more computer storage media having computer-executable instructions embodied thereon that, when executed, by one or more processors, cause the one or more processors to perform a method, the method comprising:
extracting a first set of features from a first cell of a table;
based at least in part on the extracting, deriving a first feature vector that represents the first set of features by encoding data from columns and rows of the table in a first order;
deriving a second feature vector that represents a second set of features of each cell of a row that the first cell is in by iteratively encoding from the columns and the rows of the table in a second order, wherein the second order is different from the first order;
deriving a third feature vector that represents a third set of features of each cell of a column that the first cell is in;
deriving a fourth feature vector that represents the table by encoding multiple rows of the table into the fourth feature vector and responsively encoding multiple columns of the table into the fourth feature vector;
deriving a fifth feature vector that represents the table by encoding multiple columns of the table into the fifth vector and responsively encoding multiple rows of the table into the fifth feature vector; and
based at least in part on the deriving of: the first feature vector, the second feature vector, the third feature vector, the fourth feature vector, and the fifth feature vector, generating a decision statistic for the first cell.

16. The computer storage media of claim 15, wherein the decision statistic is indicative of classifying whether the first cell includes a particular type of sensitive information.

17. The computer storage media of claim 15, wherein the deriving of the first feature vector includes concatenating a plurality of sub-vectors into the first vector, each of the plurality of sub-vectors represent an individual feature of the cell.

18. The computer storage media of claim 15, wherein any individual feature of the first set of features is indicative of at least one of: a lemmatization of each word within the first cell, a character type for each character in the first cell, and a part-of-speech tag for each word in the first cell.

19. The computer storage media of claim 15, wherein any individual feature of the second set of features is indicative of at least one of: a lemmatization of each word within the row, a character type for each character in the row, and a part-of-speech tag for each word in the row.

20. The computer storage media of claim 15, wherein any individual feature of the second set of features is indicative of at least one of: a lemmatization of each word within the column, a character type for each character in the column, and a part-of-speech tag for each word in the column.

* * * * *